United States Patent
Fukuda et al.

(10) Patent No.: US 10,428,935 B2
(45) Date of Patent: *Oct. 1, 2019

(54) METHOD AND DEVICE FOR CONTROLLING AUTOMATIC TRANSMISSION

(71) Applicant: Mazda Motor Corporation, Aki-gun, Hiroshima (JP)

(72) Inventors: Yutaro Fukuda, Hiroshima (JP); Manabu Sasahara, Hiroshima (JP); Tadashi Saito, Hiroshima (JP); Tomohiro Kubo, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 221 days.

This patent is subject to a terminal disclaimer.

(21) Appl. No.: 15/595,861

(22) Filed: May 15, 2017

(65) Prior Publication Data
US 2017/0335952 A1 Nov. 23, 2017

(30) Foreign Application Priority Data
May 19, 2016 (JP) ................. 2016-100117

(51) Int. Cl.
*F16H 61/02* (2006.01)
*F16H 61/00* (2006.01)
(Continued)

(52) U.S. Cl.
CPC ..... *F16H 61/0204* (2013.01); *F16H 61/0021* (2013.01); *F16H 61/0206* (2013.01);
(Continued)

(58) Field of Classification Search
CPC .. F16H 61/02; F16H 61/0204; F16H 61/0021; F16H 61/0206; F16H 61/061; F16H 2063/303
See application file for complete search history.

(56) References Cited

U.S. PATENT DOCUMENTS 5,967,285 A 10/1999 Mohan et al.
6,520,882 B2 2/2003 Saito
(Continued)

FOREIGN PATENT DOCUMENTS

CN 1873248 A 12/2006
CN 102164797 A 8/2011
(Continued)

*Primary Examiner* — Edwin A Young
(74) *Attorney, Agent, or Firm* — Alleman Hall Creasman & Tuttle LLP

(57) ABSTRACT

A method of controlling an automatic transmission is provided. The automatic transmission includes a piston having first and second surfaces opposite from each other, friction plates, engaging and disengaging hydraulic pressure chambers for supplying hydraulic pressure and directing the piston to push the friction plates to be engaged and disengaged, a hydraulic pressure control valve for supplying and discharging hydraulic pressure to and from the chambers, and first and second oil paths communicating the valve with the chambers. The second surface has a larger area for receiving hydraulic pressure than that of the first surface. The method includes controlling the friction plates to change from the disengaged state to the engaged state. Controlling the friction plates includes adjusting the hydraulic pressure to a first instruction pressure in a first period in response to a gear shift command, and to a second instruction pressure in a second period.

20 Claims, 13 Drawing Sheets

(51) Int. Cl.
*F16H 61/30* (2006.01)
*F16H 61/06* (2006.01)
*F16H 61/686* (2006.01)
*F16H 63/30* (2006.01)
*F16H 3/66* (2006.01)

(52) U.S. Cl.
CPC ........... *F16H 61/061* (2013.01); *F16H 61/30* (2013.01); *F16H 61/686* (2013.01); *F16H 63/3026* (2013.01); *F16H 3/66* (2013.01); *F16H 2063/303* (2013.01); *F16H 2200/006* (2013.01); *F16H 2200/2012* (2013.01); *F16H 2200/2043* (2013.01)

(56) References Cited

U.S. PATENT DOCUMENTS

| | | | |
|---|---|---|---|
| 6,599,215 B2 | 7/2003 | Takatori et al. | |
| 7,090,614 B2 | 8/2006 | Takagi | |
| 7,108,632 B2 | 9/2006 | Takagi et al. | |
| 7,384,358 B2 | 6/2008 | Suzuki | |
| 7,445,107 B2 | 11/2008 | Kawamoto et al. | |
| 7,445,572 B2 | 11/2008 | Kodama et al. | |
| 7,563,189 B2 | 7/2009 | Inuta | |
| 7,931,551 B2 | 4/2011 | Katou et al. | |
| 8,430,789 B2 | 4/2013 | Hase et al. | |
| 8,439,802 B2 | 5/2013 | Suzuki et al. | |
| 8,444,529 B2 | 5/2013 | Katou | |
| 8,726,751 B2 | 5/2014 | Martin et al. | |
| 8,788,129 B2 | 7/2014 | Hase et al. | |
| 9,062,760 B2 | 6/2015 | Kamada et al. | |
| 9,791,043 B2 | 10/2017 | Nakashima et al. | |
| 2012/0318626 A1* | 12/2012 | Jeon | F16H 61/061 192/3.57 |
| 2014/0297089 A1* | 10/2014 | Tsuda | B60W 10/115 701/22 |
| 2015/0217773 A1 | 8/2015 | Nakano et al. | |
| 2015/0362052 A1 | 12/2015 | Frait | |
| 2016/0033032 A1 | 2/2016 | Takagi | |
| 2016/0265657 A1 | 9/2016 | Herrmann et al. | |
| 2017/0335963 A1 | 11/2017 | Fukuda et al. | |
| 2018/0058604 A1 | 3/2018 | Noda et al. | |

FOREIGN PATENT DOCUMENTS

| | | |
|---|---|---|
| CN | 102235486 A | 11/2011 |
| CN | 102628509 A | 8/2012 |
| CN | 102639895 A | 8/2012 |
| CN | 103477127 A | 12/2013 |
| CN | 104412009 A | 3/2015 |
| JP | S62093555 A | 4/1987 |
| JP | S63045249 U | 3/1988 |
| JP | H023706 A | 1/1990 |
| JP | 04069414 A | 3/1992 |
| JP | H11153152 A | 6/1999 |
| JP | 2001336621 A | 12/2001 |
| JP | 2006071048 A | 3/2006 |
| JP | 2008249009 A | 10/2008 |
| JP | 2010190278 A | 9/2010 |
| JP | 2011033095 A | 2/2011 |
| JP | 2011218835 A | 11/2011 |
| JP | 2012171372 A | 9/2012 |
| WO | 2012144207 A1 | 10/2012 |
| WO | 2013178900 A1 | 12/2013 |

* cited by examiner

|  | CL1 (31) | CL2 (32) | CL3 (33) | BR1 (21) | BR2 (22) |
|---|---|---|---|---|---|
| 1ST GEAR | ○ |  |  | ○ | ○ |
| 2ND GEAR |  | ○ |  | ○ | ○ |
| 3RD GEAR | ○ | ○ |  |  | ○ |
| 4TH GEAR |  | ○ | ○ |  | ○ |
| 5TH GEAR | ○ |  | ○ |  | ○ |
| 6TH GEAR | ○ | ○ | ○ |  |  |
| 7TH GEAR | ○ |  | ○ | ○ |  |
| 8TH GEAR |  | ○ | ○ | ○ |  |
| REVERSE GEAR |  |  | ○ | ○ | ○ |

FIG. 2

METHOD AND DEVICE FOR CONTROLLING AUTOMATIC TRANSMISSION

BACKGROUND

The present invention relates to a method and device for controlling an automatic transmission, and particularly relates to a method and device for controlling an automatic transmission mounted on a vehicle.

Automatic transmissions mounted on vehicles, such as automobiles, include a torque converter and a transmission gear mechanism, and automatically perform a gear shift operation by suitably setting operating states of a plurality of frictional engageable elements, such as clutches and brakes, (i.e., by selecting a suitable drive force transmitting path), according to a driving condition of the vehicle.

A gear control of such an automatic transmission is required to reduce an engaging shock when switching the operating states of the frictional engageable elements from disengaged states to engaged states, and shorten the time for completing the engagement after a gear shift command is issued. For example, WO2012/144207A1 discloses a method for executing a pre-charging process when supplying operational pressure to a frictional engageable element to engage the frictional engageable element. This pre-charging process quickly fills hydraulic oil in an oil path leading to the frictional engageable element from a hydraulic pressure control valve which controls the oil supply, and in a hydraulic pressure chamber of the frictional engageable element.

The pre-charging process is executed by a sharp increase of hydraulic pressure to a given value in response to the gear shift command, maintaining of the increased pressure for a given period of time, and a sharp drop of the hydraulic pressure thereafter.

The method of WO2012/144207A1 requires flowing the hydraulic oil at a high flow rate (e.g., at the pre-charged hydraulic pressure) in order to shorten the time of the engagement control, while reducing the flow rate of the hydraulic oil (drop the hydraulic pressure) immediately before the completion of one stroke of a piston in order to reduce an engaging shock. In this case, a fine flow rate control is required and a hydraulic pressure control tends to become complex. Therefore, inconveniences of the engagement control being time consuming and responses of the frictional engageable elements becoming slower, arise. The slower responses of the frictional engageable elements become significantly inconvenient when attempting to further shorten the gear shifting time.

The control employing the pre-charging in the engaging operation also requires constant learning of the pre-charging time and feedbacks. For this reason, the control may become complex.

SUMMARY

The present invention is made in view of the above issues and aims to provide a method and device for controlling an automatic transmission, which reduce an engaging shock, shorten an engagement control time, and simplify the control.

According to one aspect of the present invention, a method of controlling an automatic transmission having the following structure is provided.

The automatic transmission that is the control target includes a piston, a plurality of friction plates, an engaging hydraulic pressure chamber, a disengaging hydraulic pressure chamber, a hydraulic pressure control valve, a first oil path, and a second oil path. The piston has a first surface and a second surface opposite from each other in axial directions of the piston, and movable in the axial directions.

The plurality of friction plates are disposed on the first surface side of the piston. The engaging hydraulic pressure chamber supplies hydraulic pressure to the second surface of the piston and directs the piston to an engaging position to push the friction plates to be engaged with each other in an engaged state.

The disengaging hydraulic pressure chamber supplies hydraulic pressure to the first surface of the piston and directs the piston to a disengaging position to cause the friction plates to be in a disengaged state. The hydraulic pressure control valve has an output port of hydraulic pressure, and supplies and discharges hydraulic pressure to and from the engaging hydraulic pressure chamber and the disengaging hydraulic pressure chamber.

The first oil path communicates the output port of the hydraulic pressure control valve with the engaging hydraulic pressure chamber. The second oil path communicates the output port with the disengaging hydraulic pressure chamber.

In the automatic transmission, the second surface of the piston has a larger area for receiving hydraulic pressure than that of the first surface.

The method of controlling the automatic transmission includes controlling the friction plates to change from the disengaged state to the engaged state in response to a gear shift command. The controlling the friction plates includes controlling the hydraulic pressure control valve to adjust the hydraulic pressure to a first instruction pressure in a first period in response to the gear shift command, and controlling the hydraulic pressure control valve to adjust the hydraulic pressure to a second instruction pressure in a second period directly following the first period. A change of the second instruction pressure is larger than a change of the first instruction pressure.

Here, the instruction pressure to the hydraulic pressure control valve may vary in a certain manner. Thus, each of the first and second instruction pressures is expressed by a regression line (linear regression line, curved regression line) to compare their values.

Note that "in response to the gear shift command" means "immediately after the issuance of the gear shift command," which means that another process (e.g., the pre-charging process used in the art of WO2012/144207A1) does not intervene between the issuance of the gear shift command and the start timing of the first period.

According to the above described method, the hydraulic pressure control valve is controlled to adjust the hydraulic pressure to the first instruction pressure, which changes more gradually than the second instruction pressure, in a first period, in response to the gear shift command. In other words, "the pre-charging process" used in the art of WO2012/144207A1 is not provided in the method. Therefore, according to the method of controlling the automatic transmission in this aspect, an engagement control time is shortened and the control is simplified.

In addition, according to the method, an engaging shock when switching operating states of frictional engageable elements (friction plates) from disengaged states to engaged states is reduced, and time for completing the engagement after the gear shift command is issued is shortened. These shock reduction and shortened time are achieved by the following structure.

According to the above described control method, in the automatic transmission which is the control target, the hydraulic pressure is supplied from the output port of the hydraulic pressure control valve to the engaging hydraulic pressure chamber and the disengaging hydraulic pressure chamber through the first and second oil paths, respectively. The first and second surfaces have different pressure receiving areas. Therefore, even when the hydraulic pressure applied to the first surface from the disengaging hydraulic pressure chamber is the same as the hydraulic pressure applied to the second surface from the engaging hydraulic pressure chamber, the piston is moved in the engaging direction by a pushing force according to the pressure receiving area difference which corresponds to a section of the second surface larger than the first surface. In this manner, when changing from the disengaged state to the engaged state, since the piston is moved by the pushing force corresponding to the pressure receiving area difference, the engaging shock is reduced while avoiding a complicated hydraulic pressure control which executes, for example, "the pre-charging process."

Moreover, a complicated control for reducing a flow rate of hydraulic oil immediately before a completion of a piston stroke in order to reduce the engaging shock is avoided and the engagement control time is shortened.

The first instruction pressure in the first period may be a given fixed value. According to this configuration, since the first instruction pressure is fixed to the certain value during the first period, the control is simplified compared to a case where the instruction pressure is changed during the first period.

The second instruction pressure may increase with time from the given fixed value at the start of the second period to a value of hydraulic pressure that causes the friction plates to be in the engaged state at the end of the second period. According to this configuration, the engaging shock is reduced more compared to a case where the instruction pressure is instantly increased from the pressure at the certain value to the hydraulic pressure. Thus, the friction plates and the like receive less damage, which results in a high reliability.

The second oil path may be provided with a pressure reducing valve for preventing the hydraulic pressure inside the disengaging hydraulic pressure chamber from exceeding a given value. The first instruction pressure may be lower than the given value. According to this configuration, since the first instruction pressure is lower than a set pressure (given value) of the pressure reducing valve, in the first period, the engaging hydraulic pressure chamber and the disengaging hydraulic pressure chamber are kept at the same pressure. Thus, the piston is moved only by the pushing force corresponding to the pressure receiving area difference, which is advantageous in the reduction of the engaging shock.

The piston may be formed with a through-hole communicating the engaging hydraulic pressure chamber with the disengaging hydraulic pressure chamber. According to this configuration, since the through-hole is formed in the piston, when the pressure of the disengaging hydraulic pressure chamber increases, the hydraulic oil flows into the engaging hydraulic pressure chamber through the through-hole. Therefore, when moving the piston to the engaging position, the engaging hydraulic pressure chamber receives the hydraulic oil also from the disengaging hydraulic pressure chamber. Thus, only a small amount of hydraulic oil is required to be supplied to the engaging hydraulic pressure chamber through the first oil path.

In this manner, a responsiveness in engaging the friction plates is improved. This improvement results in that even when a clearance between the friction plates is widened in order to reduce a so-called drag resistance of the friction plates, in other words, even when the required moving distance of the piston in engaging the friction plates is increased, only a small amount of oil is required to flow into the engaging hydraulic pressure chamber from the first oil path. Thus, both the reduction in the drag resistance and the improvement in the responsiveness of the frictional engagement are achieved.

Further, a restricting mechanism for restricting an oil flow from the engaging hydraulic pressure chamber to the disengaging hydraulic pressure chamber may be disposed in the through-hole.

According to this configuration, the restricting mechanism blocks the flow of the oil from the engaging hydraulic pressure chamber to the disengaging hydraulic pressure chamber through the through-hole. For example, when pressures of the engaging hydraulic pressure chamber and the disengaging hydraulic pressure chamber are uneven in the second period, the hydraulic oil flow through the through-hole is restricted. Thus, the pushing force for the piston in the engaging direction is increased and the engagement control time is shortened.

According to another aspect of the present invention, a control device of an automatic transmission having the following structure is provided.

The automatic transmission that is the control target includes a piston, a plurality of friction plates, an engaging hydraulic pressure chamber, a disengaging hydraulic pressure chamber, a hydraulic pressure control valve, a first oil path and a second oil path. The piston has a first surface and a second surface opposite from each other in axial directions of the piston, and movable in the axial directions.

The plurality of friction plates are disposed on the first surface side of the piston. The engaging hydraulic pressure chamber supplies hydraulic pressure to the second surface of the piston and directs the piston to an engaging position to push the friction plates to be engaged with each other in an engaged state.

The disengaging hydraulic pressure chamber supplies hydraulic pressure to the first surface of the piston and directs the piston to a disengaging position to cause the friction plates to be in a disengaged state. The hydraulic pressure control valve has an output port of hydraulic pressure, and supplies and discharges hydraulic pressure to and from the engaging hydraulic pressure chamber and the disengaging hydraulic pressure chamber.

The first oil path communicates the output port of the hydraulic pressure control valve with the engaging hydraulic pressure chamber. The second oil path communicates the output port with the disengaging hydraulic pressure chamber.

In the automatic transmission, the second surface has a larger area for receiving hydraulic pressure than that of the first surface.

The control device includes a processor configured to execute instructions to control the friction plates to change from the disengaged state to the engaged state in response to a gear shift command by controlling the hydraulic pressure control valve to adjust the hydraulic pressure to a first instruction pressure in a first period in response to the gear shift command, and by controlling the hydraulic pressure control valve to adjust the hydraulic pressure to a second instruction pressure in a second period directly following the first period. A change of the second instruction pressure is larger than a change of the first instruction pressure.

According to the control device described above, the engaging shock is reduced, the engagement control time is shortened, and the control is simplified.

According to another aspect of the present invention, an automatic transmission is provided, which includes a plurality of frictional engageable elements, a hydraulic circuit for supplying and discharging hydraulic pressure to and from the plurality of frictional engageable elements, a hydraulic pressure control valve provided in the hydraulic circuit and for controlling the supply and discharging of the hydraulic pressure to and from the plurality of frictional engageable elements, and a control unit for controlling the hydraulic pressure control valve. The control unit includes a processor configured to execute instructions to control the hydraulic pressure control valve to adjust the hydraulic pressure to a first instruction pressure in a first period in response to a gear shift command of the automatic transmission, and control the hydraulic pressure control valve to adjust the hydraulic pressure to a second instruction pressure in a second period directly following the first period. A change of the second instruction pressure is larger than a change of the first instruction pressure.

BRIEF DESCRIPTION OF THE DRAWINGS

FIG. 2 is an engaging combination table of frictional engageable elements of the automatic transmission.

DETAILED DESCRIPTION OF EMBODIMENTS

Hereinafter, embodiments of the present invention are described with reference to the accompanying drawings. Note that the following embodiments are merely some modes of the present invention, and the present invention is not to be limited to any parts of the following modes except for their essential structures and configurations.

<Embodiment>

Overall Structure of Automatic Transmission 1

Figure 1:
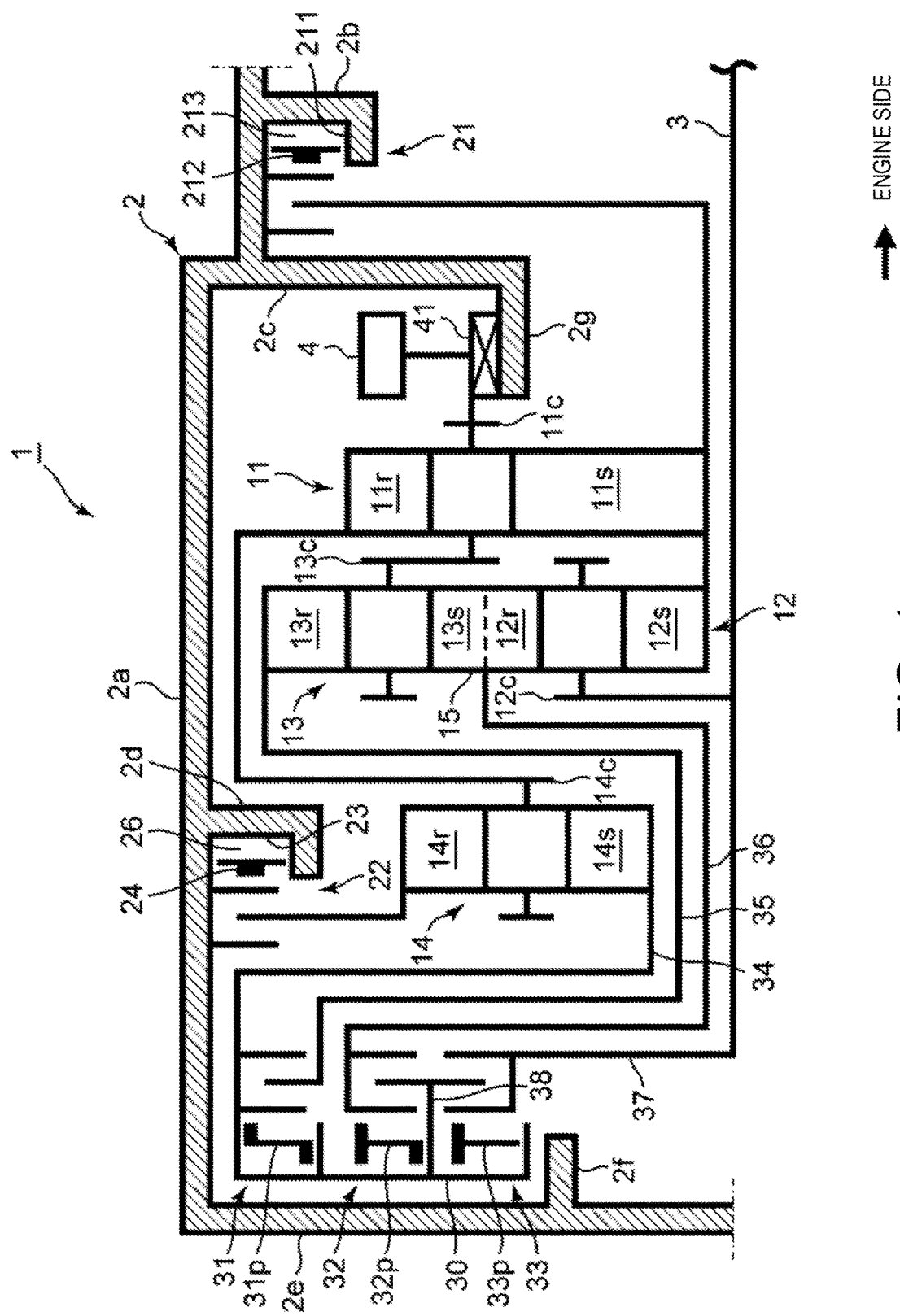
FIG. 1 is a substantial view of an automatic transmission according to one embodiment of the present invention.

FIG. 1 is a substantial view of an automatic transmission 1 for an automobile (vehicle) according to this embodiment. The automatic transmission 1 includes a transmission case 2. The automatic transmission further includes an input shaft 3 extending from an engine side, and an output gear 4, four planetary gear sets (first planetary gear set 11, second planetary gear set 12, third planetary gear set 13, and fourth planetary gear set 14), two brakes (first brake 21 and second brake 22), and three clutches (first clutch 31, second clutch 32, and third clutch 33), which are disposed in the transmission case 2. The four planetary gear sets, the two brakes, and the three clutches are provided as a transmission mechanism.

The input shaft 3 receives a drive force generated in the engine of the vehicle. The output gear 4 outputs a driving force at a given gear ratio controlled by the transmission mechanism. In this embodiment, an example in which the automatic transmission receives the drive force of the engine without using a torque converter (fluid transmitter) is described.

The transmission case 2 has an outer circumferential wall $2a$, a first intermediate wall $2b$ provided on an engine-side end part of the outer circumferential wall $2a$, a second intermediate wall $2c$ provided on a side of the first intermediate wall $2b$ opposite from the engine (counter-engine side), a third intermediate wall $2d$ provided in an intermediate portion of the outer circumferential wall $2a$ in axial directions of the input shaft 3, a side wall $2e$ provided on a counter-engine-side end part of the outer circumferential wall $2a$, a boss part $2f$ extending from a center part of the side wall $2e$ to the engine side, and a cylindrical part $2g$ extending from an inner circumferential end of the second intermediate wall $2c$ to the counter-engine side.

The four planetary gear sets 11 to 14 are disposed from the engine side in the order of the first planetary gear set 11, the second (inner circumferential) and third (outer circumferential) planetary gear sets 12 and 13 disposed overlapping with each other in radial directions of the transmission case 2, and the fourth planetary gear set 14. The first planetary gear set 11 includes a carrier $11c$, a pinion (not illustrated) supported by the carrier $11c$, a sun gear $11s$, and a ring gear $11r$. The first planetary gear set 11 is a single pinion type in which the pinion is directly meshed with the sun gear $11s$ and the ring gear $11r$. The second to fourth planetary gear sets 12 to 14 are also a single pinion type and include carrier $12c$, $13c$ and $14c$, pinions (not illustrated), sun gears $12s$, $13s$ and $14s$, and ring gears $12r$, $13r$ and $14r$, respectively.

The ring gear $12r$ of the second planetary gear set 12 and the sun gear $13s$ of the third planetary gear set 13 which are overlapped in the radial directions are integrally formed by, for example, welding or shrink-fitting. Thus, the ring gear $12r$ and the sun gear $13s$ are normally coupled to each other and form an integrated rotational element 15. The sun gear $11s$ of the first planetary gear set 11 is normally coupled to the sun gear $12s$ of the second planetary gear set 12, the ring gear $11r$ of the first planetary gear set 11 is normally coupled to the carrier $14c$ of the fourth planetary gear set 14, and the carrier 11c of the first planetary gear set 11 is normally coupled to the carrier 13c of the third planetary gear set 13. The input shaft 3 is normally coupled to the carrier 12c of the second planetary gear set 12. The output gear 4 is normally coupled to the carrier 11c of the first planetary gear set 11 and the carrier 13c of the third planetary gear set 13. The output gear 4 is rotatably supported to the cylindrical part 2g of the transmission case 2 via a bearing 41.

The sun gear 14s of the fourth planetary gear set 14 is coupled to a first rotational member 34 extending to the counter-engine side. Similarly, the ring gear 13r of the third planetary gear set 13 is coupled to a second rotational member 35 and the integrated rotational element 15 is coupled to a third rotational member 36. These rotational members 35 and 36 also extend to the counter-engine side. The carrier 12c of the second planetary gear set 12 is coupled to a fourth rotational member 37 via the input shaft 3.

The first brake 21 is disposed on the first intermediate wall 2b of the transmission case 2. The first brake 21 includes a cylinder 211, a piston 212 fitted into the cylinder 211, and a hydraulic oil pressure chamber 213 defined by the cylinder 211 and the piston 212. When a given engaging hydraulic pressure is supplied to the hydraulic oil pressure chamber 213, a friction plate of the first brake 21 is engaged and the first brake 21 fixes the sun gear 11s of the first planetary gear set 11 and the sun gear 12s of the second planetary gear set 12 to the transmission case 2.

The second brake 22 is disposed on the third intermediate wall 2d. The second brake 22 includes a cylinder 23, a piston 24 fitted into the cylinder 23, and an engaging hydraulic pressure chamber 26 defined by the cylinder 23 and the piston 24. When a given engaging hydraulic pressure is supplied to the engaging hydraulic pressure chamber 26, the friction plate of the second brake 22 is engaged and the second brake 22 fixes the ring gear 14r of the fourth planetary gear set 14 to the transmission case 2. In this embodiment, an example of applying the frictional engageable element provided with features of the present invention to the second brake 22 is described. This second brake 22 is described later in detail with reference to FIGS. 3 to 11.

The first to third clutches 31 to 33 are disposed in a counter-engine-side end section inside the transmission case 2. The first to third clutches 31 to 33 are overlapped with each other in the radial directions so that the second clutch 32 is located on the inner circumferential side of the first clutch 31 and the third clutch 33 is located on the inner circumferential side of the second clutch 32 at the same position in the axial directions.

The first clutch 31 disconnects the sun gear 14s of the fourth planetary gear set 14 from the ring gear 13r of the third planetary gear set 13. In other words, the first clutch 31 switches the connection state between the first rotational member 34 coupled to the sun gear 14s and the second rotational member 35 coupled to the ring gear 13r.

The second clutch 32 disconnects the sun gear 14s of the fourth planetary gear set 14 from the integrated rotational element 15 (i.e., the ring gear 12r of the second planetary gear set 12 and the sun gear 13s of the third planetary gear set 13). In other words, the second clutch 32 switches the connection state between the first rotational member 34 coupled to the sun gear 14s and the third rotational member 36 coupled to the integrated rotational element 15.

The third clutch 33 disconnects the sun gear 14s of the fourth planetary gear set 14 from the input shaft 3 and the carrier 12c of the second planetary gear set 12. In other words, the third clutch 33 switches the connection state between the first rotational member 34 coupled to the sun gear 14s and the fourth rotational member 37 coupled to the carrier 12c via the input shaft 3.

The first rotational member 34 is switched in the connection state with the second rotational member 35 by the first clutch 31, switched in the connection state with the third rotational member 36 by the second clutch 32, and switched in the connection state with the fourth rotational member 37 by the third clutch 33. Thus, the first rotational member 34 is commonly used as one of each pair of rotational members of which the connection state is switched by one of the first to third clutches 31 to 33. Therefore, a common rotational member 30 having a wall perpendicular to the axis of the input shaft 3 is disposed near the side wall 2e of the transmission case 2, on the counter-engine side of the first to third clutches 31 to 33. Further, the first rotational member 34 is coupled to the common rotational member 34.

The common rotational member 30 is commonly used by the first to third clutches 31 to 33 and supports cylinders, pistons, hydraulic oil pressure chambers, hydraulic oil paths, centrifugal balance hydraulic pressure chambers, centrifugal balance chamber components, etc. of the first to third clutches 31 to 33. FIG. 1 illustrates pistons 31p, 32p, and 33p of the first to third clutches 31 to 33 in a simplified manner. Note that a common member 38 is attached to the second and third clutches 32 and 33 to hold friction plates thereof.

As described above, the automatic transmission 1 of this embodiment includes the transmission mechanism having the first to fourth planetary gear sets 11 to 14, and the first and second brakes 21 and 22 and the first to third clutches 31 to 33 (five frictional engageable elements), and for changing the gear ratio between the input shaft 3 and the output gear 4. FIG. 2 is an engaging combination table of the five frictional engageable elements of the automatic transmission 1. As indicated in the table, three of the five frictional engageable elements are selectively engaged (○ marks) to realize first to eighth forward gear ranges and a reverse gear range. In FIG. 2, "CL1," "CL2" and "CL3" indicate the first to third clutches 31 to 33, respectively, and "BR1" and "BR2" indicate the first and second brakes 21 and 22, respectively.

Details of Frictional Engageable Element

Figure 3:
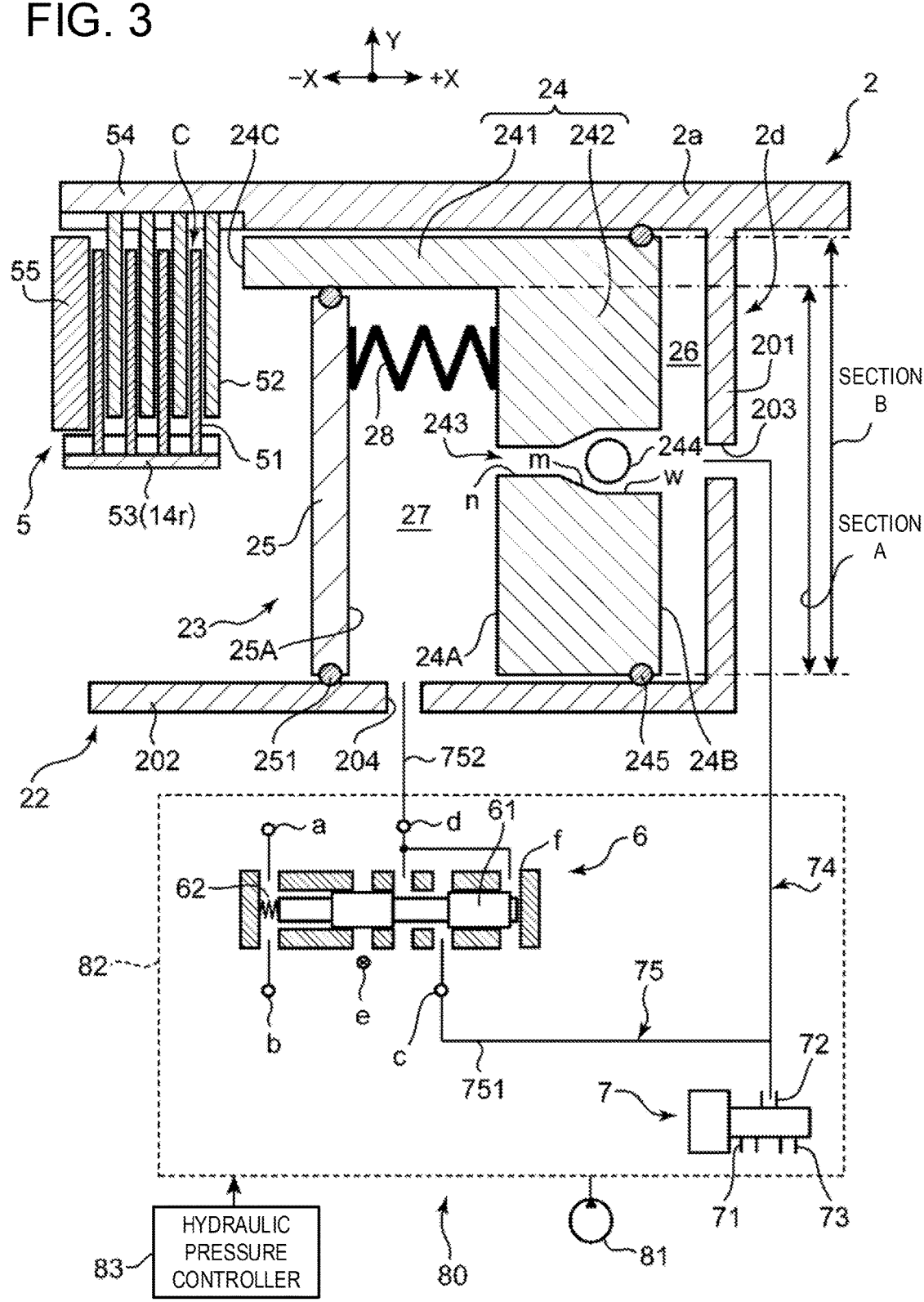
FIG. 3 is a view illustrating a schematic cross section of a structure of a second brake which is one of the frictional engageable elements, and illustrating a configuration of a hydraulic mechanism of the second brake, according to the embodiment.

FIG. 3 is a view illustrating a schematic cross section of a structure of one of the frictional engageable elements of the automatic transmission 1 and illustrating a configuration of a hydraulic mechanism 80 of the frictional engageable element. Here, the second brake 22 is illustrated in FIG. 3. In FIGS. 3 and 7 to 10, the axial directions of the input shaft 3 are indicated as X directions and the radial directions of the automatic transmission 1 are indicated as Y directions. Further, for the sake of convenience, the left side of the drawings in the X directions is indicated as the −X direction and the right side of the drawings in the X directions is indicated as the +X direction.

The second brake 22 is disposed in the cylinder 23 formed by the third intermediate wall 2d as described above, and includes the piston 24, a sealing ring 25, the engaging hydraulic pressure chamber 26, a disengaging hydraulic pressure chamber 27, a return spring 28, and a friction plate unit 5 (a plurality of friction plates). The hydraulic mechanism 80 is attached to the second brake 22. The hydraulic mechanism 80 includes an oil pump 81, a hydraulic circuit 82, and a hydraulic pressure controller 83 for controlling the oil pump 81 and the hydraulic circuit 82. The hydraulic circuit 82 includes a pressure reducing valve 6 and a linear solenoid valve 7 (hydraulic pressure control valve).

The third intermediate wall 2d is formed by a first wall portion 201 extending radially inwardly from the outer circumferential wall 2a of the transmission case 2, and a second wall portion 202 extending axially (in the −X direction) from a radially inner edge of the first wall portion 201. The outer circumferential wall 2a and the second wall portion 202 oppose to each other in the radial directions with a given gap therebetween. A space formed by the outer circumferential wall 2a and the first and second wall portions 201 and 202 is the space of the cylinder 23 for the second brake 22. The first wall portion 201 is formed with a first supply port 203 for supplying hydraulic pressure to the engaging hydraulic pressure chamber 26. The second wall portion 202 is formed with a second supply port 204 for supplying hydraulic pressure to the disengaging hydraulic pressure chamber 27.

The piston 24 has a first surface 24A and a second surface 24B axially opposite from each other, and is axially movable in the space between the outer circumferential wall 2a and the second wall portion 202 (inside the cylinder 23). The first surface 24A faces the disengaging hydraulic pressure chamber 27 and the second surface 24B faces the engaging hydraulic pressure chamber 26. The piston 24 moves between a disengaging position at which the friction plate unit 5 is in a disengaged state (e.g., the position illustrated in FIG. 7) and an engaging position at which the piston 24 pushes the friction plate unit 5 to be in an engaged state (the position illustrated in FIG. 10).

The piston 24 includes a pushing piece 241 disposed adjacently to the outer circumferential wall 2a, and a pressure receiving piece 242 for sliding on an inner circumferential surface of the outer circumferential wall 2a and an outer circumferential surface of the second wall portion 202. The pressure receiving piece 242 is bored a through-hole 243 axially penetrating the pressure receiving piece 242. Further, sealing members 245 are fitted into inner and outer circumferential surfaces of the pressure receiving piece 242.

The pushing piece 241 projects in the −X direction from the pressure receiving piece 242, and includes, at a tip end in a pushing direction (in the −X direction), a tip end surface 24C for applying a pushing force to the friction plate unit 5. The pressure receiving piece 242 is a separator between the engaging hydraulic pressure chamber 26 and the disengaging hydraulic pressure chamber 27. Note that in this embodiment, the engaging hydraulic pressure chamber 26 may be communicated with the disengaging hydraulic pressure chamber 27 by the through-hole 243. The sealing members 245 are for sealing between the inner circumferential surface of the pressure receiving piece 242 and the outer circumferential surface of the second wall portion 202 and sealing between the outer circumferential surface of the pressure receiving piece 242 and the inner circumferential surface of the outer circumferential wall 2a, while allowing the axial movement of the piston 24.

The through-hole 243 is a cylindrical hole having different diameters in the axial directions, and has a larger diameter section w, a smaller diameter section n, and an intermediate section m therebetween. The larger diameter section w is formed on the second surface 24B side, i.e., the engaging hydraulic pressure chamber 26 side. The smaller diameter section n is formed on the first surface 24A side, i.e., the disengaging hydraulic pressure chamber 27 side. The intermediate section m is gradually tapered from the larger diameter section w to the smaller diameter section n.

A pressure ball 244 (restricting mechanism) for restricting a flow of hydraulic oil from the engaging hydraulic pressure chamber 26 to the disengaging hydraulic pressure chamber 27 is disposed inside the through-hole 243. A diameter of the pressure ball 244 is smaller than a diameter of the larger diameter section w and larger than a diameter of the smaller diameter section n. When the hydraulic pressure of the disengaging hydraulic pressure chamber 27 is higher than that of the engaging hydraulic pressure chamber 26, the pressure ball 244 floats within the larger diameter section w and does not restrict the flow of the hydraulic oil from the engaging hydraulic pressure chamber 26 to the disengaging hydraulic pressure chamber 27.

On the other hand, when the hydraulic pressure inside the engaging hydraulic pressure chamber 26 is higher than that of the disengaging hydraulic pressure chamber 27, the pressure ball 244 is stopped at the intermediate section m to block the through-hole 243, and restricts the flow of the hydraulic oil between the engaging hydraulic pressure chamber 26 and the disengaging hydraulic pressure chamber 27.

The sealing ring 25 is a flat plate member having an annular shape and disposed on the first surface 24A side of the piston 24 to oppose to the pressure receiving piece 242. The sealing ring 25 is disposed between the pushing piece 241 of the piston 24 and the second wall portion 202, and forms the disengaging hydraulic pressure chamber 27 together with the pushing piece 241 of the piston 24 and the second wall portion 202. Sealing members 251 are attached to inner and outer circumferential surfaces of the sealing ring 25. The sealing members 251 are for sealing between an outer circumferential edge of the sealing ring 25 and an inner circumferential surface of the pushing piece 241 and sealing between an inner circumferential edge of the sealing ring 25 and the outer circumferential surface of the second wall portion 202.

The engaging hydraulic pressure chamber 26 is space where hydraulic pressure for moving the piston 24 to the engaging position (in the −X direction) is supplied. The engaging hydraulic pressure chamber 26 is defined by the first and second wall portions 201 and 202, the outer circumferential wall 2a, and the second surface 24B of the piston 24. In other words, the engaging hydraulic pressure chamber 26 hydraulically applies the second surface 24B the pushing force to move the piston 24 to the engaging position at which the friction plate unit 5 is pushed to be in the engaged state (friction plates are engaged with each other).

The disengaging hydraulic pressure chamber 27 is space where hydraulic pressure for moving the piston 24 to the disengaging position (in the +X direction) is supplied. The disengaging hydraulic pressure chamber 27 is defined by the second wall portion 202, the pushing piece 241 of the piston 24, a +X-side surface 25A of the sealing ring 25, and the first surface 24A of the piston 24. In other words, the disengaging hydraulic pressure chamber 27 hydraulically applies the first surface 24A the pushing force to move the piston 24 to the disengaging position at which the friction plate unit 5 is pushed to be in the disengaged state. The return spring 28 for elastically biasing the piston in the +X direction is disposed inside this disengaging hydraulic pressure chamber 27. When hydraulic pressure is not supplied to the engaging hydraulic pressure chamber 26, the return spring 28 moves (returns) the piston 24 in the +X direction.

Here, a pressure receiving area of the second surface 24B is set larger than that of the first surface 24A. Hereinafter, a section of the first surface 24A where hydraulic pressure is received from the disengaging hydraulic pressure chamber 27, i.e., the pressure receiving area of the first surface 24A, is referred to as the section A (schematically indicated as "SECTION A" in FIG. 3). Further, a section of the second surface 24B where hydraulic pressure is received from the engaging hydraulic pressure chamber 26, i.e., the pressure receiving area of the second surface 24B, is referred to as the section B (schematically indicated as "SECTION B" in FIG. 3). In this embodiment, the relationship between these pressure receiving areas is SECTION B>SECTION A.

Such a difference in pressure receiving area between the sections A and B allows the piston 24 to move based on the difference. For example, if the engaging hydraulic pressure chamber 26 and the disengaging hydraulic pressure chamber 27 are supplied the same level of hydraulic pressure, the hydraulic pressure is received at the first and second surfaces 24A and 24B. In this case, since the pressure receiving area of the second surface 24B is larger than the pressure receiving area of the first surface 24A, a pushing force in the −X direction, corresponding to the pressure receiving area difference, acts on the piston 24. Since the piston 24 is bored the through-hole 243, upon the action of the pushing force in the −X direction, the oil inside the disengaging hydraulic pressure chamber 27 flows into the engaging hydraulic pressure chamber 26 through the through-hole 243. Thus, the piston 24 moves in the −X direction. In other words, the hydraulic pressures in the engaging hydraulic pressure chamber 26 and the disengaging hydraulic pressure chamber 27 become even, and then the piston 24 is moved in the −X direction by the pushing force corresponding to the pressure receiving area difference.

The friction plate unit 5 includes a plurality of friction plates disposed by leaving clearances therebetween and is disposed on the first surface 24A side of the piston 24. For example, the friction plate unit 5 is comprised of a plurality of drive plates 51 and a plurality of driven plates 52 that are alternately arranged by leaving a given clearance C. Facings are adhered to both surfaces of each drive plate 51. The drive plates 51 are spline coupled to a first spline part 53, and the driven plates 52 are spline coupled to a second spline part 54. The first spline part 53 corresponds to an outer circumferential part of the ring gear 14r of the fourth planetary gear set 14 illustrated in FIG. 1. The second spline part 54 is provided to a part of the outer circumferential wall 2a of the transmission case 2.

The tip end surface 24C of the piston 24 contacts with one of the driven plates 52 which is located on the most +X side and applies the pushing force to the friction plate unit 5. A retaining plate 55 is disposed adjacently to one of the drive plates 51 which is located on the most −X side. The retaining plate 55 restricts movements of the drive plates 51 and the driven plates 52 in the −X direction.

The hydraulic mechanism 80 supplies and discharges a given level of hydraulic pressure to and from the frictional engageable element (the second brake 22 in FIG. 3) of the automatic transmission 1. The oil pump 81 of the hydraulic mechanism 80 is driven by the engine to flow hydraulic oil to a required part(s) and generates a given hydraulic pressure. The hydraulic circuit 82 is provided to each of the first and second brakes 21 and 22 and the first to third clutches 31 to 33 (frictional engageable elements), and selectively supplies hydraulic pressure to the frictional engageable elements to realize the respective gear ranges illustrated in FIG. 2. FIG. 3 only illustrates the pressure reducing valve 6 and the linear solenoid valve 7 of the hydraulic mechanism 80 that performs the supply and discharge of the hydraulic pressure to and from the second brake 22.

The linear solenoid valve 7 is a hydraulic pressure control valve for supplying and discharging hydraulic pressure to and from each of the engaging hydraulic pressure chamber 26 and the disengaging hydraulic pressure chamber 27. The linear solenoid valve 7 includes an input port 71 for receiving hydraulic oil from the oil pump 81, an output port 72 for outputting the hydraulic oil (hydraulic pressure), a drain port 73 for discharging the hydraulic oil, and a spool (not illustrated) which operates in response to a power distribution to a coil thereof. The operation of the spool causes the input and output ports 71 and 72 to communicate with each other when supplying the hydraulic pressure to the engaging hydraulic pressure chamber 26 and the disengaging hydraulic pressure chamber 27, and causes the output port 72 and the drain port 73 to communicate with each other when discharging the hydraulic pressure. The linear solenoid valve 7 adjusts an amount of oil discharged from the output port 72 based on a control of the power distribution amount to the coil.

The hydraulic circuit 82 includes a first oil path 74 for communicating the linear solenoid valve 7 with the engaging hydraulic pressure chamber 26, and a second oil path 75 for communicating the linear solenoid valve 7 with the disengaging hydraulic pressure chamber 27. For example, an upstream end of the first oil path 74 is connected to the output port 72 and a downstream end of the first oil path 74 is connected to the first supply port 203 communicating with the engaging hydraulic pressure chamber 26. An upstream end of the second oil path 75 is connected to the output port 72 and a downstream end of the second oil path 75 is connected to the second supply port 204 communicating with the disengaging hydraulic pressure chamber 27. Thus, both of the first and second oil paths 74 and 75 receive the oil from the same output port 72 of the linear solenoid valve 7 instead of receiving it through different hydraulic supply paths.

The second oil path 75 is divided into an upstream oil path 751 and a downstream oil path 752 at the pressure reducing valve 6. When causing the friction plate unit 5 to change from the disengaged state to the engaged state, hydraulic pressure is supplied to the engaging hydraulic pressure chamber 26 and the disengaging hydraulic pressure chamber 27 simultaneously from the output port 72 of the linear solenoid valve 7 through the first and second oil paths 74 and 75.

The pressure reducing valve 6 is built in the second oil path 75 and adjusts the hydraulic pressure of the disengaging hydraulic pressure chamber 27 to be at or below a given value (a set pressure of the pressure reducing valve 6). The pressure reducing valve 6 includes a plurality of ports a, b, c, d, e and f, and a spool 61 for switching ports among the plurality of ports. The ports "a" and "b" communicate with a spring chamber accommodating a return spring 62 for elastically biasing the spool 61 in the +X direction. The port "c" is an input port and the port "d" is an output port. The input port c is connected to a downstream end of the upstream oil path 751 of the second oil path 75. The output port d is connected to an upstream end of the downstream oil path 752, and thus the output port d is connected with the second supply port 204.

The port "e" is a drain port and the port "f" is a feedback port. When the biasing force of the return spring 62 is superior to (higher than) hydraulic pressure supplied to the feedback port f, the input and output ports c and d communicate with each other. Thus, the upstream and downstream oil paths 751 and 752 communicate with each other, which allows the hydraulic pressure to be supplied to the disengaging hydraulic pressure chamber 27. On the other hand, when hydraulic pressure which overtakes the biasing force of the return spring 62 is supplied to the feedback port f, the hydraulic pressure moves the spool 61 in the −X direction and the output port d and the drain port e communicate with each other, which allows the hydraulic pressure to be discharged from the disengaging hydraulic pressure chamber 27. In other words, when the hydraulic pressure of the disengaging hydraulic pressure chamber 27 becomes high, the hydraulic pressure supplied to the pressure reducing valve 6 from the feedback port f also becomes high, the spool 61 is operated to communicate the output port d with the drain port e, and the disengaging hydraulic pressure chamber 27 is depressurized. When the biasing force of the return spring 62 accordingly becomes superior, the spool 61 resumes communicating the input port c with the output port d, which allows the hydraulic pressure to be supplied to the disengaging hydraulic pressure chamber 27.

The hydraulic pressure controller 83 controls the hydraulic pressures supplied to the engaging hydraulic pressure chamber 26 and the disengaging hydraulic pressure chamber 27 by controlling the operation of the solenoid of the linear solenoid valve 7. The hydraulic pressure controller 83 also controls the linear solenoid valves connected to the other frictional engageable elements, and thus controls hydraulic pressures supplied to the first brake 21 and the first to third clutches 31 to 33.

Control System Configuration of Automatic Transmission 1

Figure 4:
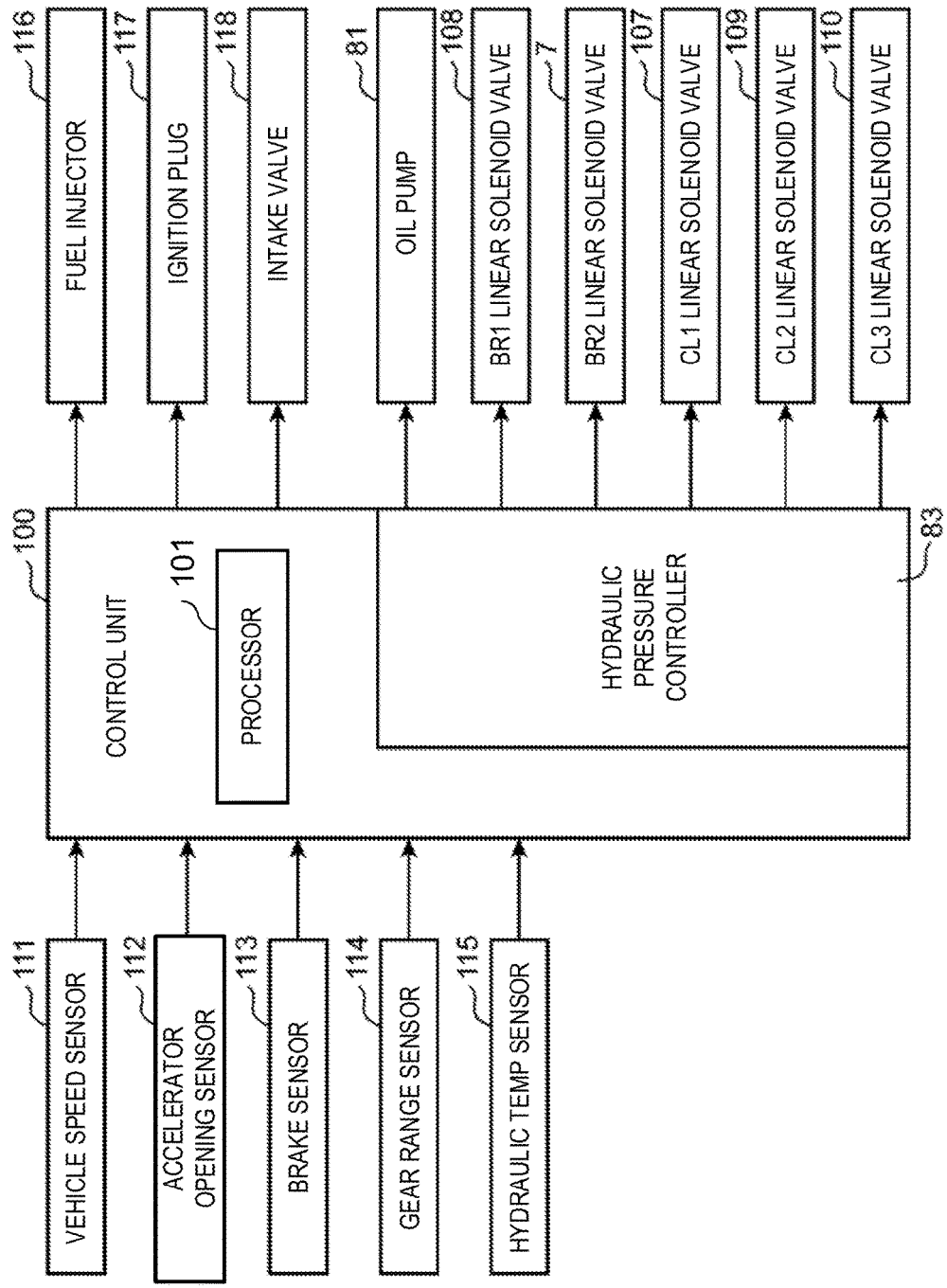
FIG. 4 is a block diagram schematically illustrating a control system configuration of the automatic transmission of the embodiment.

A control system configuration of the automatic transmission 1 of this embodiment is described with reference to FIG. 4 which is a block diagram schematically illustrating the control system configuration. In FIG. 4, the linear solenoid valve connected to the first brake 21 is indicated as "BR1 LINEAR SOLENOID VALVE 108." Similarly, the linear solenoid valve connected to the second brake 22 is indicated as "BR2 LINEAR SOLENOID VALVE 7," the linear solenoid valve connected to the first clutch 31 is indicated as "CL1 LINEAR SOLENOID VALVE 107," the linear solenoid valve connected to the second clutch 32 is indicated as "CL2 LINEAR SOLENOID VALVE 109," and the linear solenoid valve connected to the third clutch 33 is indicated as "CL3 LINEAR SOLENOID VALVE 110."

As illustrated in FIG. 4, a control unit 100 which is the control device of the vehicle in this embodiment receives various information from the vehicle, such as vehicle speed information detected by a vehicle speed sensor 111, accelerator opening information detected by an accelerator opening sensor 112, brake information detected by a brake sensor 113, gear range (gear shift) information detected by a gear range sensor 114, and hydraulic temperature information detected by a hydraulic temperature sensor 115.

The control unit 100 performs calculations based on the received various information and transmits control signals to a fuel injector 116, an ignition plug 117, and an intake valve 118. The control unit 100 includes the hydraulic pressure controller 83 and a processor 101 configured to execute instructions to send and receive signals, and the hydraulic pressure controller 83 transmits control signals to the oil pump 81, the BR1 linear solenoid valve 108, the BR2 linear solenoid valve 7, the CL1 linear solenoid valve 107, the CL2 linear solenoid valve 109, and the CL3 linear solenoid valve 110. The hydraulic pressure controller 83 may have a separate processor or may utilize the processor 101 as an integrated part of the control unit 100.

Note that the control unit 100 stores a given gear shift map (not illustrated). The gear shift map has the vehicle speed and the accelerator opening as parameters and is designed to have a plurality of ranges for obtaining a suitable gear range according to these vehicle speed and accelerator opening.

Hydraulic Pressure Control Executed by Control Unit 100

Figure 5:
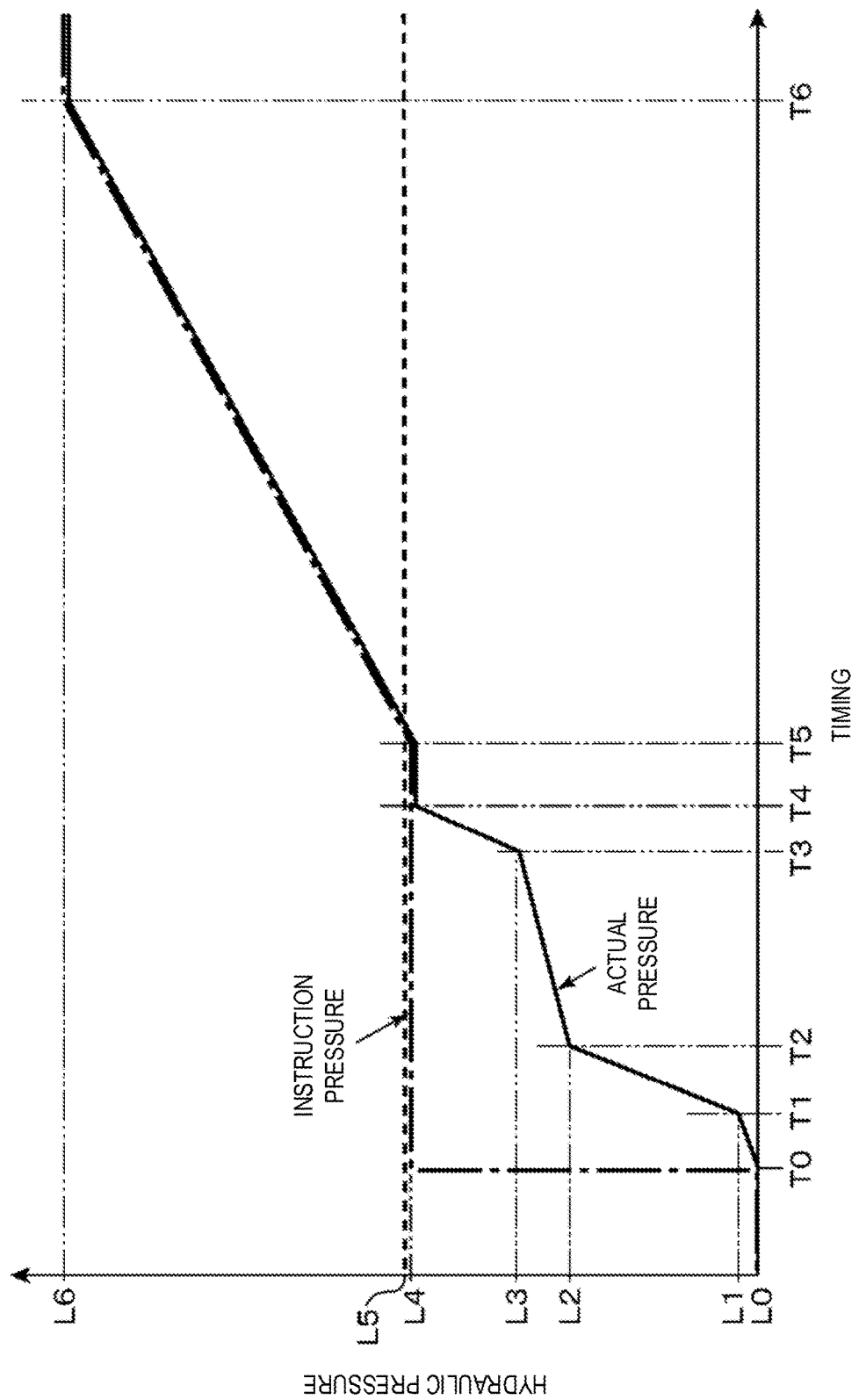
FIG. 5 is a time chart of a hydraulic pressure control executed by a hydraulic pressure controller to engage the second brake of the automatic transmission.
Figure 6:
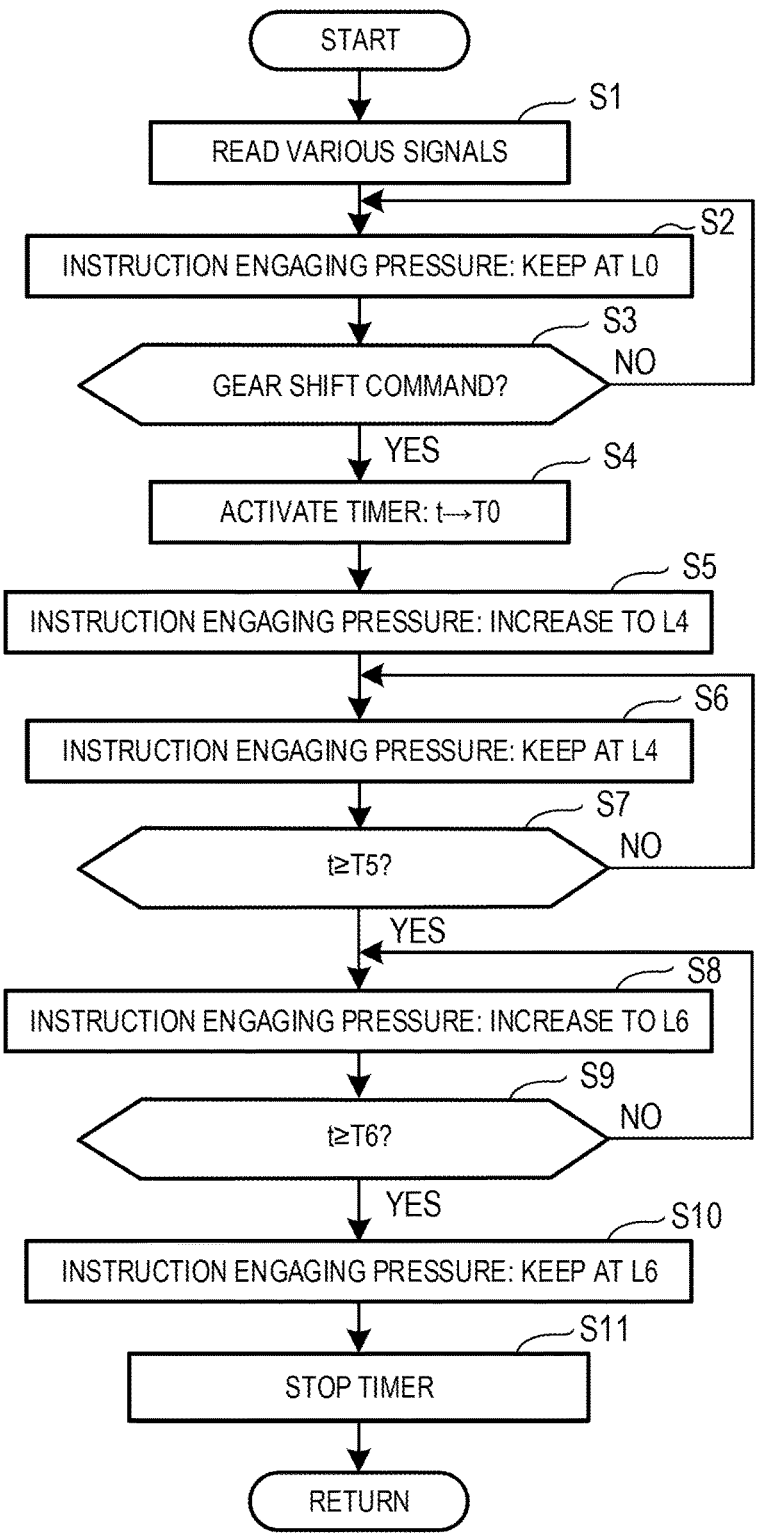
FIG. 6 is a flowchart illustrating a control in a gear shift operation of the automatic transmission.

A hydraulic pressure control executed by the control unit 100 is described with reference to FIGS. 5 and 6. FIG. 5 is a time chart of the hydraulic pressure control executed by the hydraulic pressure controller 83 of the control unit 100 to engage the second brake 22 of the automatic transmission 1. FIG. 6 is a flowchart illustrating a hydraulic pressure control operation performed by the control unit 100 of the automatic transmission 1.

First, the control unit 100 reads various signals (S1). The read signals include the vehicle speed information, the accelerator opening information, the brake information, the gear range (gear shift) information, and the hydraulic temperature information. Here, the hydraulic pressure controller 83 instructs the linear solenoid valve 7 to keep the hydraulic pressure (engaging pressure) at a hydraulic pressure level L0, in other words, keep the disengaged state (S2). This state corresponds to a state at a timing T0 in FIG. 5 and in which the engaging hydraulic pressure chamber 26 illustrated in FIG. 3 has little volume.

Next, if a gear shift command is issued (S3: YES), the control unit 100 activates a built-in timer (S4), and the hydraulic pressure controller 83 instructs the linear solenoid valve 7 to adjust the engaging pressure to a hydraulic pressure level L4 (S5). This state still corresponds to the state at the timing T0 in FIG. 5. Note that whether "the gear shift command" is issued at S3 is determined based on the gear range sensor signal (P-range, R-range, N-range or D-range), the vehicle speed sensor signal, and the accelerator opening signal.

Until the counted time by the timer reaches a timing T5 (while S7: NO), the hydraulic pressure controller 83 instructs the linear solenoid valve 7 to keep the engaging pressure at the hydraulic pressure level L4 (S6). This state corresponds to a period from the timing T0 to the timing T5 in FIG. 5 (first period).

Note that as illustrated in FIG. 5, the actual engaging pressures in the oil paths 74 and 75 extending to the frictional engageable element gradually increase to a hydraulic pressure level L1 from the timing T0 to a timing T1, increase to a hydraulic pressure level L2 at a sharper inclination from the timing T1 to a timing T2. Then the actual engaging pressures gradually increase to a hydraulic pressure level L3 from the timing T2 to a timing T3, and then increase to a hydraulic pressure level L4 at a sharper inclination from the timing T3 to a timing T4. From the timing T4 to the timing T5, the actual engaging pressure is the hydraulic pressure level L4 which is substantially the same as the instruction pressure.

Here, the hydraulic pressure level L4 is lower than a set pressure level L5 of the pressure reducing valve 6, in other words, a release pressure. Therefore, in the first period from the timing T0 to the timing T5, the pressure reducing valve 6 does not operate and the hydraulic pressures in the engaging hydraulic pressure chamber and the disengaging hydraulic pressure chamber become even.

Next, when the counted time by the timer reaches the timing T5 (S7: YES), the hydraulic pressure controller 83 instructs the linear solenoid valve 7 to increase the engaging pressure to a hydraulic pressure level L6 (S8). Note that as illustrated in FIG. 5, the pressure increase at S8 is performed gradually from the timing T5 to a timing T6, i.e., at a continuously positive inclination. During the pressure increase (in FIG. 5, in an early part of a second period from the timing T5 to the timing T6), the instruction engaging pressure and the actual engaging pressure exceed the set pressure level L5 of the pressure reducing valve 6. Thus, a pressure difference is produced between the engaging hydraulic pressure chamber and the disengaging hydraulic pressure chamber, which is described later in detail.

When the counted time by the timer reaches the timing T6 (S9: YES), the hydraulic pressure controller 83 instructs the linear solenoid valve 7 to keep the engaging pressure at the hydraulic pressure level L6 (S10). Then the control unit 100 stops the timer (S11) and terminates the series of processes of the engaging operation.

Note that as illustrated in FIG. 5, the instruction engaging pressure from the hydraulic pressure controller 83 to the linear solenoid valve 7 increases with time from the hydraulic pressure level L4 at the timing T5 to the hydraulic pressure level L6 at the timing T6. This increase of the instruction pressure is achieved by a program stored in the hydraulic pressure controller 83 beforehand.

As further illustrated in FIG. 5, the pressure increase from the timing T5 to the timing T6 is performed such that the actual engaging pressure substantially matches with the instruction engaging pressure.

In this embodiment, the instruction engaging pressure from the hydraulic pressure controller 83 is kept at the hydraulic pressure level L4 in the first period, and the instruction engaging pressure is increased from the hydraulic pressure level L4 to the hydraulic pressure level L6 in the second period. Thus, the change of the instruction pressure in the second period is larger than that of the instruction pressure in the first period.

Note that although the instruction pressure in the first period is kept at the hydraulic pressure level L4 in this embodiment, it may vary at a given inclination. Also in this case, the change of the instruction pressure in the second period is larger than that of the instruction pressure in the first period.

Details of Engaging Operation

The engaging operation of the frictional engageable element is described in detail with reference to FIGS. 7 to 10, which illustrate the engaging operation of the second brake 22 as an example.

Figure 7:
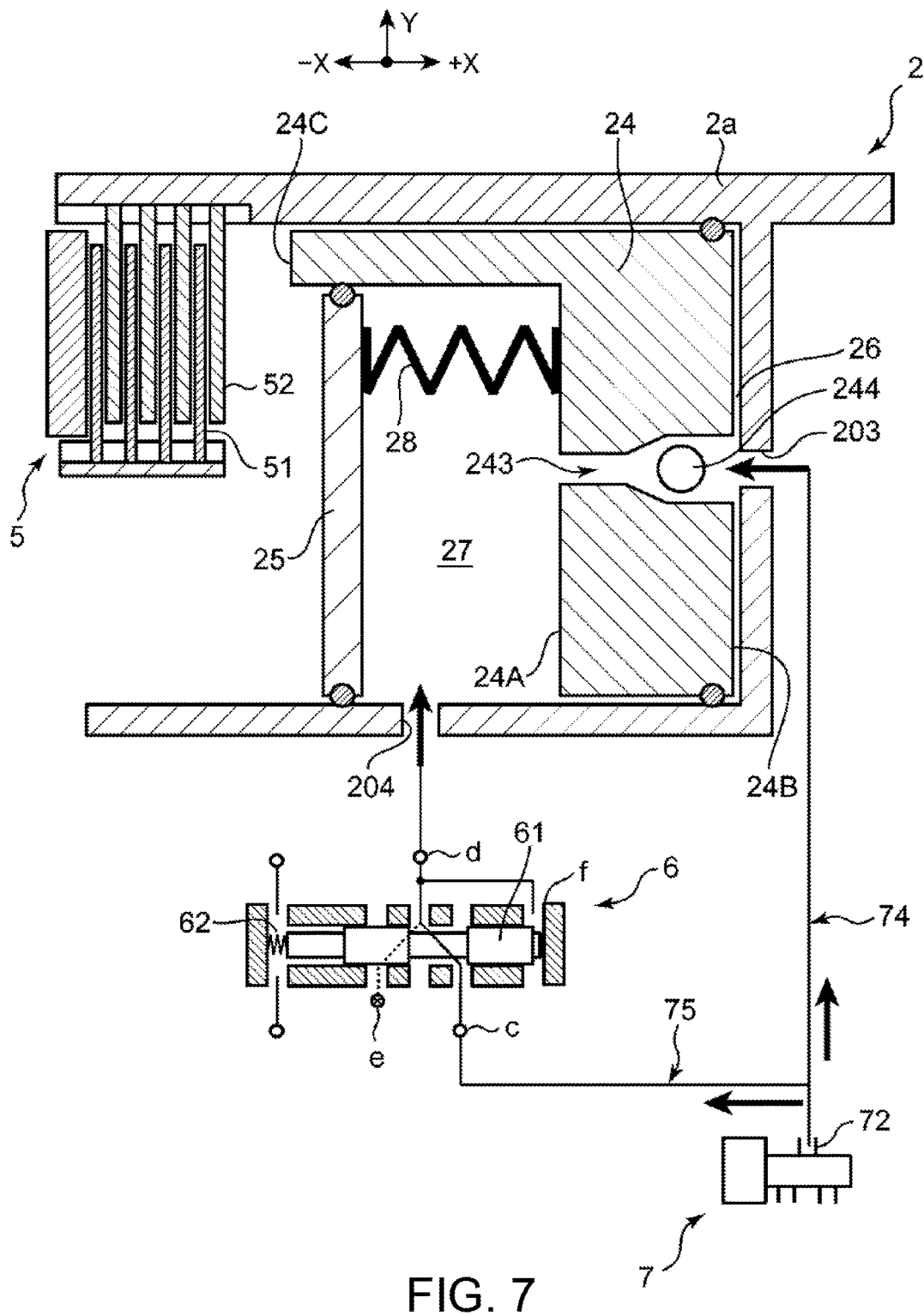
FIG. 7 is a cross-sectional view schematically illustrating the engaging operation of the second brake in the gear shift operation of the automatic transmission.

The state of the second brake 22 illustrated in FIG. 7 indicates the state around (before and after) the timing T0 in FIG. 5. The state before the timing T0 is a standby state where hydraulic pressure is not yet supplied to the engaging hydraulic pressure chamber 26 and the disengaging hydraulic pressure chamber 27 through the linear solenoid valve 7. Here, the piston 24 is pushed in the +X direction by the biasing force of the return spring 28 without receiving influence of hydraulic pressure, and located at the disengaging position. The tip end surface 24C of the piston 24 is separated from the friction plate unit 5 by a given distance, and the drive plates 51 and the driven plates 52 of the friction plate unit 5 are disengaged from each other. Due to the movement of the piston 24 in the +X direction, the engaging hydraulic pressure chamber 26 has the smallest volume, whereas the volume of the disengaging hydraulic pressure chamber 27 becomes the largest volume.

Note that in FIG. 7, for easier understanding of the structure, the second surface 24B of the piston 24 is slightly separated from the first wall portion 201 of the transmission case 2 in the −X direction; however, it may actually be in contact with the first wall portion 201.

Next, when the hydraulic pressure controller 83 instructs the linear solenoid valve 7 to increase the engaging pressure to the hydraulic pressure level L4 at the timing T0, as indicated by the thick arrows at the first and second oil paths 74 and 75 illustrated in FIG. 7, the hydraulic oil is started to flow into the engaging hydraulic pressure chamber 26 and the disengaging hydraulic pressure chamber 27. For example, the hydraulic pressure controller 83 controls the input and output ports 71 and 72 of the linear solenoid valve 7 to communicate with each other so that the hydraulic oil discharged from the oil pump 81 flows through the first and second oil paths 74 and 75. The hydraulic oil is started to flow from the common output port 72 of the linear solenoid valve 7 into the engaging hydraulic pressure chamber 26 through the first oil path 74 and at the same time, into the disengaging hydraulic pressure chamber 27 through the upstream oil path 751 of the second oil path 75, the pressure reducing valve 6, and the downstream oil path 752. Here, the pushing force for the piston 24 is not hydraulically produced yet, and the piston 24 is located at its end position on the +X side due to the biasing force of the return spring 28.

At the timing T0, the input and output ports c and d of the pressure reducing valve 6 are communicated with each other by the biasing force of the return spring 62. This is because the hydraulic pressure level L4 is set lower than the set pressure level L5 of the pressure reducing valve 6.

Figure 8:
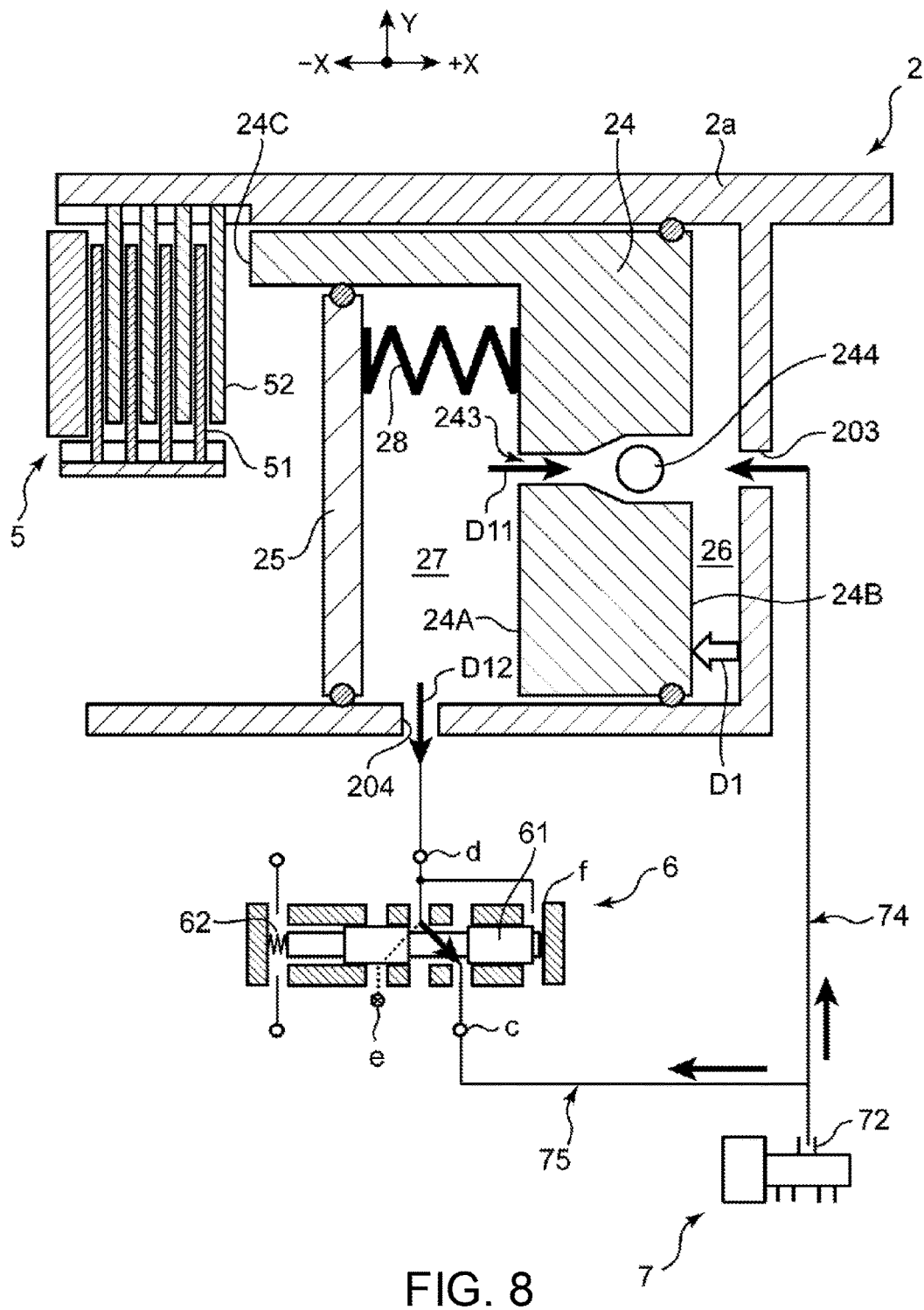
FIG. 8 is a cross-sectional view schematically illustrating the engaging operation of the second brake in the gear shift operation of the automatic transmission.

Next, the state of the second brake 22 illustrated in FIG. 8 indicates the state where the engaging hydraulic pressure chamber 26 and the disengaging hydraulic pressure chamber 27 are filled with the hydraulic oil after being started to flow as illustrated in FIG. 7, and the piston 24 moves in the −X direction. As illustrated in FIG. 8, also when the same level of hydraulic pressure is supplied to the engaging hydraulic pressure chamber 26 and the disengaging hydraulic pressure chamber 27, the piston 24 moves based on the pressure receiving area difference between the first and second surfaces 24A and 24B. Since the pressure receiving area of the second surface 24B is larger than that of the first surface 24A as described above, a pushing force D1 acts on the piston 24 in the −X direction according to the pressure receiving area difference. In other words, pushing force D1=(hydraulic pressure x (area of section B−area of section A). Thus, the piston 24 is moved in the −X direction by the pushing force D1. Note that since the pushing force D1 needs to overtake the biasing force of the return spring 28 in +X direction, the pressure receiving area difference is set in consideration of the biasing force of the return spring 28.

When the piston 24 moves in the −X direction, the hydraulic pressure inside the disengaging hydraulic pressure chamber 27 increases. Since the piston 24 is in an early stage of the moving process in the −X direction, the volume of the disengaging hydraulic pressure chamber 27 is relatively large and contains a large amount of hydraulic oil. Therefore, as indicated by the arrow D11 of FIG. 8, the hydraulic oil in the disengaging hydraulic pressure chamber 27 flows into the engaging hydraulic pressure chamber 26 through the through-hole 243 according to the movement of the piston 24 in the −X direction. Thus, the balance in the hydraulic pressure between the engaging hydraulic pressure chamber 26 and the disengaging hydraulic pressure chamber 27 is substantially maintained.

Note that as indicated by the arrow D12, hydraulic oil may reverse back into the second oil path 75 depending on the level of hydraulic pressure inside the disengaging hydraulic pressure chamber 27.

Since the engaging hydraulic pressure chamber 26 receives the hydraulic oil from the disengaging hydraulic pressure chamber 27 as described above, only a small amount of hydraulic oil is required to be supplied to the engaging hydraulic pressure chamber 26 through the first oil path 74. In other words, only the hydraulic oil at the flow rate high enough to produce the pushing force D1 based on the pressure receiving area difference is required to be applied through the linear solenoid valve 7. Therefore, high hydraulic responsiveness is obtained in moving the piston 24 in the −X direction. As the piston 24 moves, the tip end surface 24C approaches the friction plate unit 5 and the return spring 28 is gradually compressed.

Figure 9:
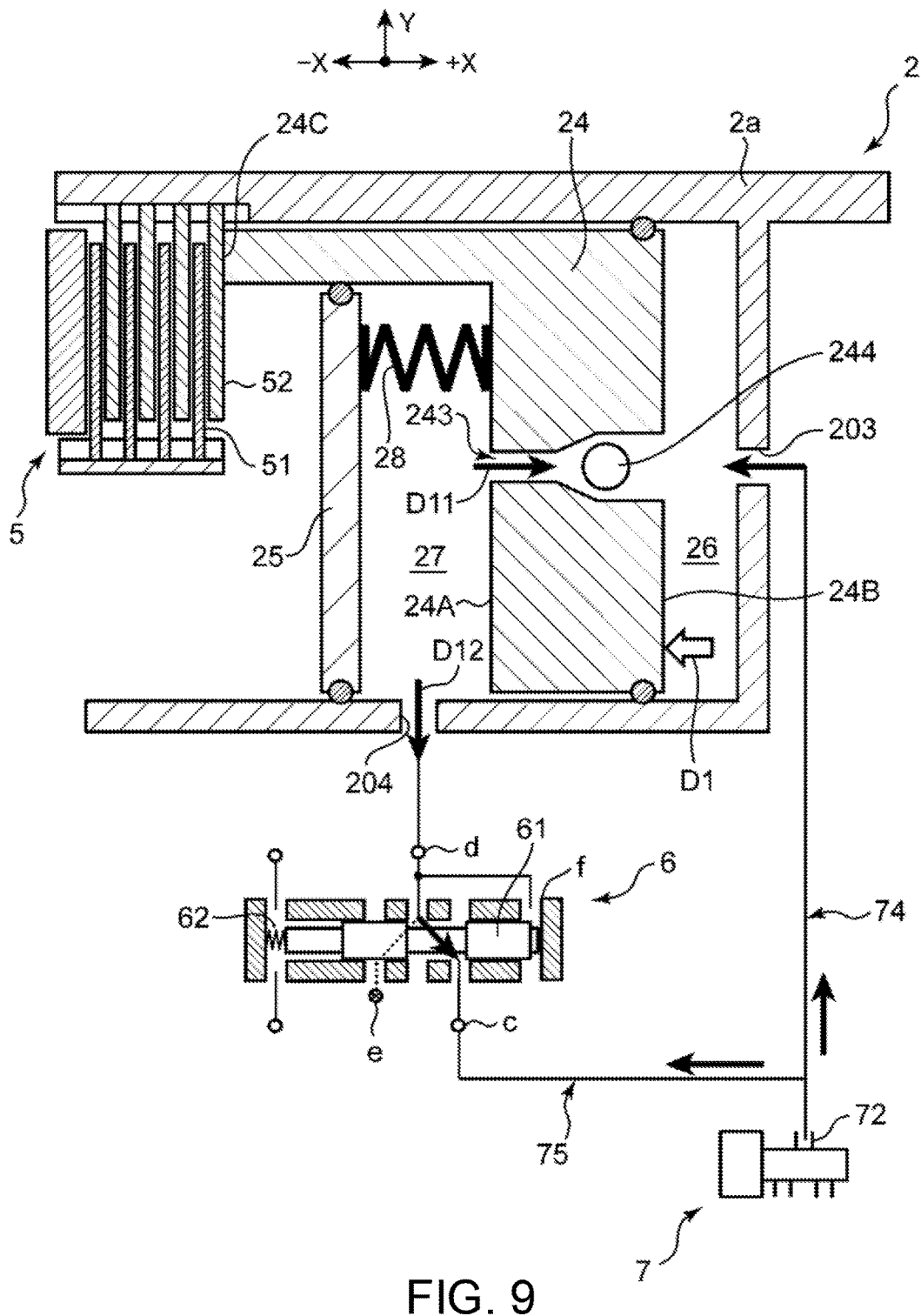
FIG. 9 is a cross-sectional view schematically illustrating the engaging operation of the second brake in the gear shift operation of the automatic transmission.

The state of the second brake 22 illustrated in FIG. 9 indicates the state at or immediately before the timing T5. The piston 24 moves in the −X direction and the tip end surface 24C is located at the position (engaging position) contacting with the friction plate unit 5 (driven plate 52), i.e., the zero touch state for friction plates 51, 52. Even in this state, only the pushing force D1 based on the pressure receiving area difference acts on the second surface 24B of the piston 24 and the flows of oil indicated by the arrows D11 and D12 occur, similar to the state of FIG. 8.

As the tip end surface 24C contacts with the friction plate unit 5 and as the piston 24 pushes the friction plate unit 5, the clearance between the drive plates 51 and the driven plates 52 is closed and eventually a frictional engaging force is produced between the plates 51 and 52. Also at this point, only the pushing force D1 described above contributes in the pushing of the piston 24. Therefore, the drive plates 51 and the driven plates 52 are engaged by a light engaging pressure in the early stage of the engagement, which contributes in reducing an engaging shock of the friction plate unit 5.

Figure 10:
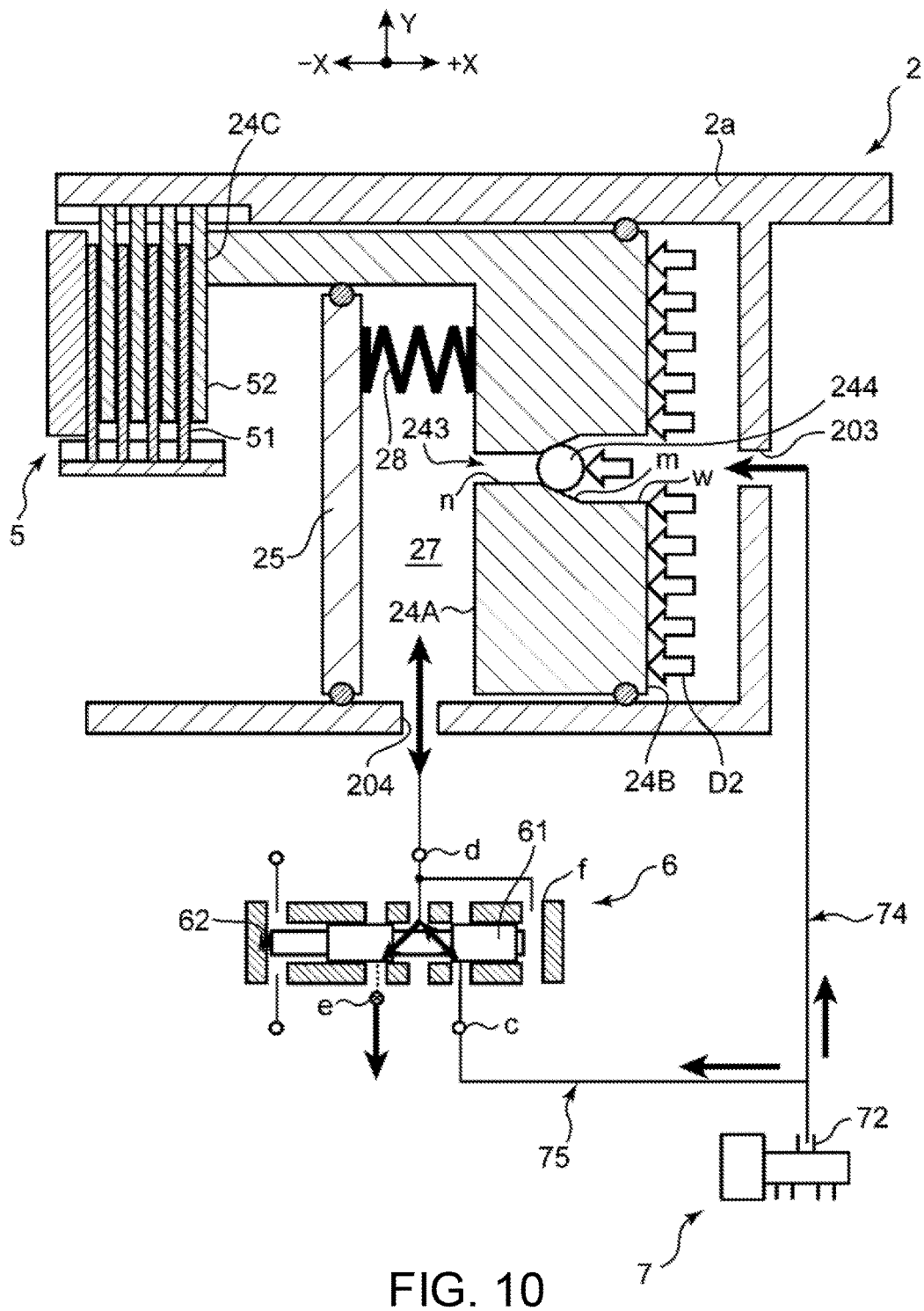
FIG. 10 is a cross-sectional view schematically illustrating the engaging operation of the second brake in the gear shift operation of the automatic transmission.

The state of the second brake 22 illustrated in FIG. 10 indicates the state where the instruction engaging pressure and the actual engaging pressure in the second period is at or above the hydraulic pressure level L5, and the friction plate unit 5 is engaged at a given engaging pressure. In this state, the hydraulic pressure controller 83 controls the linear solenoid valve 7 to discharge a given engaging hydraulic pressure (line pressure) from the output port 72. Thus, the engaging hydraulic pressure is suppliable to the engaging hydraulic pressure chamber 26 and the disengaging hydraulic pressure chamber 27 through the first and second oil paths 74 and 75.

Here, once the actual engaging pressure reaches the release pressure, the pressure reducing valve 6 starts the pressure limiting operation to adjust the hydraulic pressure of the disengaging hydraulic pressure chamber 27 so as not to exceed a given pressure (lower than the engaging hydraulic pressure). For example, when the hydraulic pressure of the disengaging hydraulic pressure chamber 27 increases and the feedback port f of the pressure reducing valve 6 receives hydraulic pressure overtaking the biasing force of the return spring 62, the spool 61 is moved in the −X direction by the hydraulic pressure and the output port d communicates with the drain port e. Therefore, the hydraulic pressure of the disengaging hydraulic pressure chamber 27 is maintained below the certain pressure. Thus, only the engaging hydraulic pressure chamber 26 is pressurized.

By having the pressure inside the engaging hydraulic pressure chamber 26 higher than that inside the disengaging hydraulic pressure chamber 27, the pressure ball 244 moves in the −X direction and blocks the through-hole 243. Therefore, the movement of the hydraulic oil in both directions between the engaging hydraulic pressure chamber 26 and the disengaging hydraulic pressure chamber 27 are restricted. Thus, a large pushing force D2 acts on the piston 24 in the −X direction according to the difference between the engaging hydraulic pressure (the hydraulic pressure of the engaging hydraulic pressure chamber 26) and the disengaging hydraulic pressure (the hydraulic pressure of the disengaging hydraulic pressure 27) and to the pressure receiving area difference. In other words, pushing force D2=((hydraulic pressure of engaging hydraulic pressure chamber 26)×(area of section B)−(hydraulic pressure of disengaging hydraulic pressure chamber 27)×(area of section A)).

Thus, since the pushing force D2 is larger than the pushing force D1 is applied, the piston 24 is pushed in the −X direction with a stronger force. This pushing force D2 is given to the friction plate unit 5 via the tip end surface 24C. Therefore, the friction plate unit 5 is engaged at a given brake engaging pressure.

Note that the pushing forces D1 and D2 are set by also taking into consideration the pushing force of the return spring 28 in the +X direction.

Supplemental Description Regarding Instruction Pressure Setting

The setting of the instruction pressure from the hydraulic pressure controller 83 to the linear solenoid valve is supplementarily described with reference to FIGS. 11A and 11B.

Figure 11A:
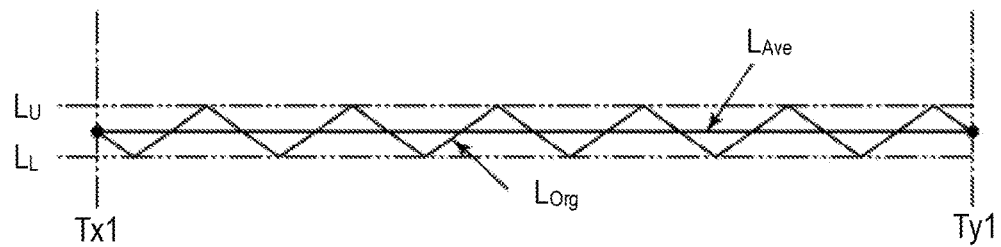
FIGS. 11A and 11B are schematic diagrams illustrating settings of an instruction pressure.

FIG. 11A schematically illustrates the instruction pressure in the first period in FIG. 5. The instruction to the linear solenoid valve from the hydraulic pressure controller 83 is performed by, for example, a current control. Therefore, as illustrated in FIG. 11A, an actual instruction pressure $L_{Org}$ between a timing Tx1 and a timing Ty1 varies between a value $L_L$ and a value $L_U$. In this embodiment, the instruction pressure $L_{Org}$ with such a variation is described as an instruction pressure $L_{Ave}$ which is an average value of the varying instruction pressure $L_{Org}$.

Figure 11B:
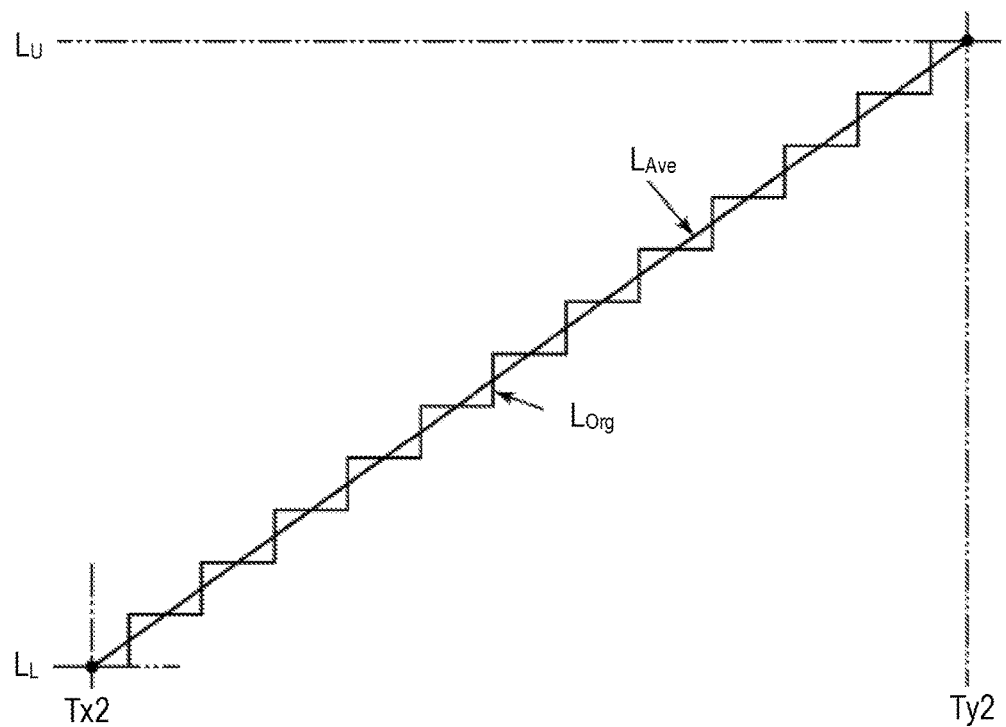

FIG. 11B schematically illustrates the instruction pressure in the second period in FIG. 5. As illustrated in FIG. 11B, the actual instruction pressure $L_{Org}$ between a timing Tx2 and a timing Ty2 increases from the value $L_L$ to the value $L_U$ in a stepwise fashion. In this embodiment, such an actual instruction pressure $L_{Org}$ is described as an instruction pressure $L_{Ave}$ which is a regression line (linear regression line in FIG. 11B).

Note that the instruction pressure in the second period may be expressed by a curved regression line depending on the mode of the actual instruction pressure.

Operations and Effects

According to a method of controlling the automatic transmission 1 of this embodiment, the instruction for maintaining the hydraulic pressure level L4 is outputted to the linear solenoid valve 7 in the first period in response to the gear shift command. In other words, according to the control method of the automatic transmission 1, "the pre-charging process" used in the art of WO2012/144207A1 is not provided. Therefore, the time of the engagement control is shortened and the control is simplified. Moreover, in a case of employing the pre-charging in the engagement control, a so-called pre-charge learning (a feedback of a pre-charging time) is required and complicates the control, whereas in the control method of this embodiment which does not employ the pre-charging process, such a pre-charge learning is not required.

Note that as is apparent from FIG. 5, in this embodiment "the first period in response to the gear shift command" means "immediately after the issuance of the gear shift command," which means that the timing T0 which is the received timing of the gear shift command is the start timing of the first period and another process does not intervene between the issuance and the timing T0.

Moreover, according to the control method of the automatic transmission 1 of this embodiment, the following operations and effects are obtained in combination with the structure of the automatic transmission 1. The automatic transmission 1 includes the linear solenoid valve 7 commonly used for the engaging hydraulic pressure chamber 26 and the disengaging hydraulic pressure chamber 27. The automatic transmission 1 further includes the first oil path 74 communicating the output port 72 of the linear solenoid valve 7 with the engaging hydraulic pressure chamber 26, and the second oil path 75 communicating the output port 72 with the disengaging hydraulic pressure chamber 27. When causing the friction plate unit 5 to change from the disengaged state to the engaged state, hydraulic pressure is supplied from the output port 72 simultaneously to the engaging hydraulic pressure chamber 26 and the disengaging hydraulic pressure chamber 27 though the first and second oil paths 74 and 75, respectively.

In the above structure, the hydraulic pressure receiving area of the second surface 24B of the piston 24 is set larger than that of the first surface 24A. Therefore, even when the hydraulic pressure applied to the first surface 24A from the disengaging hydraulic pressure chamber 27 is the same as the hydraulic pressure applied to the second surface 24B from the engaging hydraulic pressure chamber 26, the piston 24 is moved in the engaging direction (−X direction) by the pushing force D1 according to the pressure receiving area difference which corresponds to the section of the second surface 24B larger than the first surface 24A. When changing from the disengaged state to the engaged state, since the piston 24 is moved by the weak pushing force D1 corresponding to the pressure receiving area difference, the engaging shock of the friction plate unit 5 is reduced. Moreover, a complicated hydraulic pressure control for the engaging shock reduction is unnecessary. That is, a complicated control for reducing the flow rate of the hydraulic oil immediately before a completion of a piston stroke is avoided, and thus the engagement control time is shortened.

Since the piston 24 includes the through-hole 243 communicating the engaging hydraulic pressure chamber 26 with the disengaging hydraulic pressure chamber 27, when the pressure of the disengaging hydraulic pressure chamber 27 increases, the hydraulic oil flows into the engaging hydraulic pressure chamber 26 through the through-hole 243. Therefore, when moving the piston 24 in the engaging direction, the engaging hydraulic pressure chamber 26 receives the hydraulic oil from the disengaging hydraulic pressure chamber 27. Thus, only a small amount of hydraulic oil is required to be supplied to the engaging hydraulic pressure chamber 26 through the first oil path 74. In other words, only the hydraulic oil for producing the pushing force D1 based on the pressure receiving area difference is required to be supplied to the engaging hydraulic pressure chamber 26 through the linear solenoid valve 7.

Therefore, in the automatic transmission 1 of this embodiment, since the piston 24 moves with the small amount of oil, the responsiveness in engaging the friction plate unit 5 is improved. This improvement is advantageously exerted even when the clearance C between the drive plates 51 and the driven plates 52 is widened in order to reduce a so-called drag resistance of the friction plate unit 5. Thus, even when the required moving distance of the piston 24 for the frictional engagement is increased, only a small amount of oil is required to flow into the engaging hydraulic pressure chamber 26 from the first oil path 74, which prevents the responsiveness for the frictional engagement from lowering. As a result, both the reduction in the drag resistance and the improvement in the responsiveness of the frictional engagement are achieved.

The pressure ball 244 for restricting the oil flow from the engaging hydraulic pressure chamber 26 to the disengaging hydraulic pressure chamber 27 is disposed in the through-hole 243. The pressure ball 244 blocks the through-hole 243 when needed, to prohibit the flow of the hydraulic oil between the engaging hydraulic pressure chamber 26 and the disengaging hydraulic pressure chamber 27. Thus, the engaging hydraulic pressure chamber 26 and the disengaging hydraulic pressure chamber 27 are hydraulically separated from each other and cause the large pushing force D2 to act on the piston 24 in the engaging direction.

The second oil path 75 includes the pressure reducing valve 6 for preventing the hydraulic pressure of the disengaging hydraulic pressure chamber 27 from exceeding the given value. The pressure reducing valve 6 adjusts the hydraulic pressure of the disengaging hydraulic pressure chamber 27 at or below the set pressure of the pressure reducing valve 6 to achieve the smooth movement of the piston 24 in the engaging direction (−X direction). For example, after the piston 24 contacts with the friction plate unit 5 and the clearance C between the plates 51 and 52 is closed, the given engaging hydraulic pressure is supplied to the engaging hydraulic pressure chamber 26 through the first oil path 74, while adjusting the hydraulic pressure of the disengaging hydraulic pressure chamber 27 by the pressure reducing valve 6. Thus, the piston 24 is smoothly moved to the engaging position.

Since the automatic transmission 1 includes the linear solenoid valve 7 as the hydraulic pressure control valve for the engaging hydraulic pressure chamber 26 and the disengaging hydraulic pressure chamber 27, the oil supply amount is adjusted corresponding to the power distribution amount to the solenoid coil of the linear solenoid valve 7 and a highly accurate hydraulic pressure control is achieved.

Another Embodiment

Figure 12:
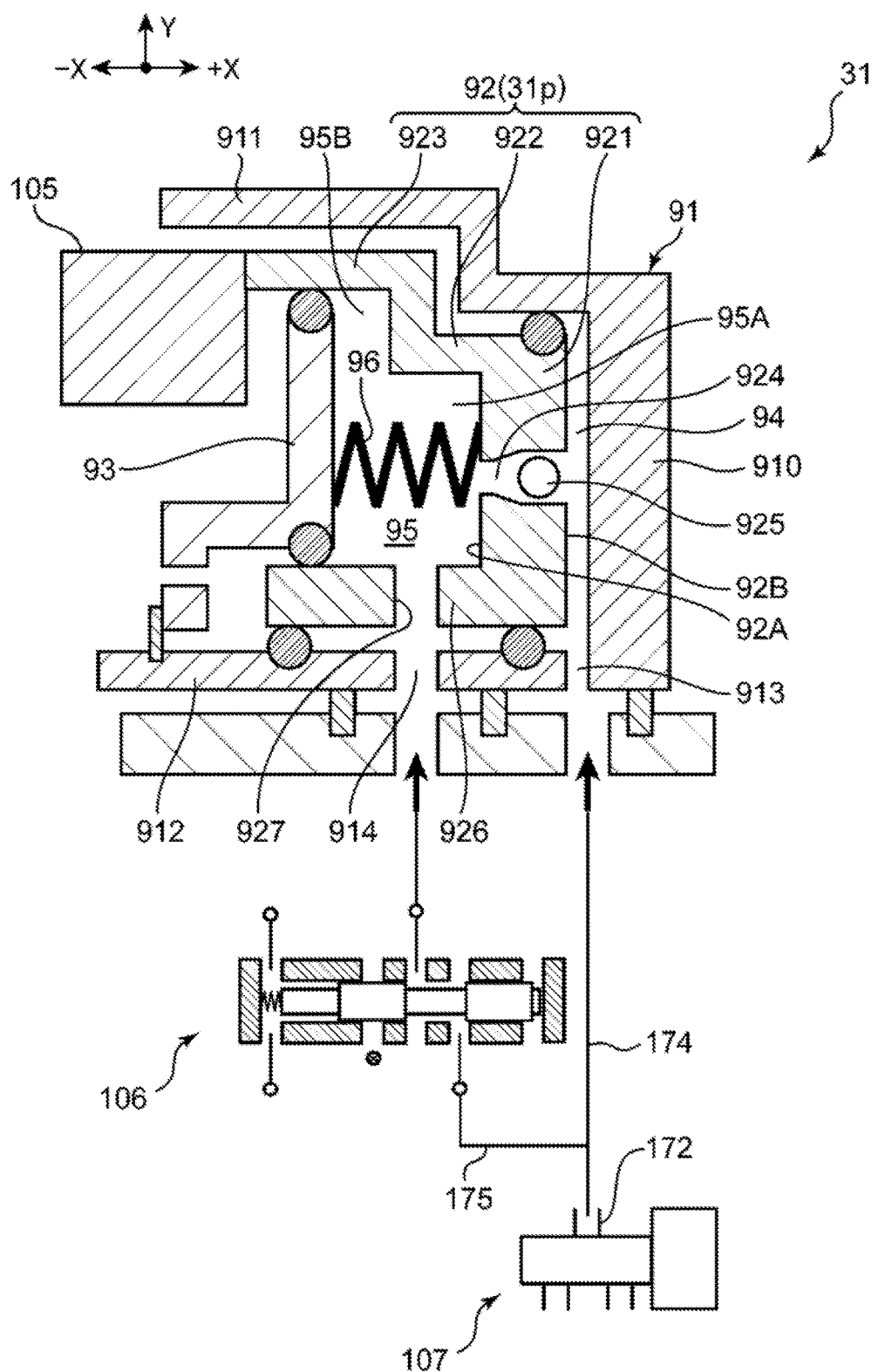
FIG. 12 is a view illustrating a schematic cross section of a structure of a first clutch which is one of the frictional engageable elements, and illustrating a part of a configuration of a hydraulic mechanism of the first clutch, according to the embodiment.

In the above embodiment, the second brake 22 is described as one example of the frictional engageable element. In the following embodiment, a clutch is described as another example of the frictional engageable element. FIG. 12 is a view schematically illustrating a configuration of the first clutch 31 which is one of the frictional engageable elements provided to the automatic transmission 1.

As illustrated in FIG. 12, the first clutch 31 includes a drum 91, a piston 92, a sealing ring 93, an engaging hydraulic pressure chamber 94, and a disengaging hydraulic pressure chamber 95. The first clutch 31 engages and disengages a friction plate unit 105. A pressure reducing valve 106 and a linear solenoid valve 107 are applied as a hydraulic mechanism of the first clutch 31. The pressure reducing valve 106 and the linear solenoid valve 107 have the same structures as those of the pressure reducing valve 6 and the linear solenoid valve 7 of the second brake 22.

The drum 91 is supported by the transmission case 2 to be rotatable about a center axis of the automatic transmission 1. The drum 91 includes a circular plate part 910 extending in the Y directions, an outer cylindrical part 911 extending from a radially outer edge of the circular plate part 910 and having a larger diameter than the circular plate part 910, and an inner cylindrical part 912 coaxially disposed on the inner side of the outer cylindrical part 911. The inner cylindrical part 912 is formed with a first supply port 913 and a second supply port 914 for a hydraulic pressure supply.

The piston 92 is a member corresponding to the piston 31p illustrated in FIG. 1, and includes a pressure receiving part 921, a small cylindrical part 922, and a large cylindrical part 923. The pressure receiving part 921 has a first surface 92A on the friction plate unit 105 side and a second surface 92B on the opposite side from the first surface 92A, and the both surfaces receive hydraulic pressure. The pressure receiving part 921 includes a through-hole 924 penetrating in the axial directions, a pressure ball 925 is disposed inside the through-hole 924. An inner cylindrical part 926 projects from a radially inner edge of the pressure receiving part 921 and extends in the −X direction. The inner cylindrical part 926 is bored a third supply port 927 communicating with the second supply port 914. An edge of the large cylindrical part 923 on the −X side pushes the friction plate unit 105. The sealing ring 93 is disposed between the piston 92 and the friction plate unit 105, and blocks a gap between the large cylindrical part 923 and the inner cylindrical part 926.

The engaging hydraulic pressure chamber 94 (hydraulic oil pressure chamber) is space between (the second surface 92B side of) the pressure receiving part 921 of the piston 92 and the circular plate part 910 of the drum 91, and receives hydraulic pressure from a first oil path 174 through the first supply port 913. The disengaging hydraulic pressure chamber 95 (centrifugal balance hydraulic pressure chamber) is space defined by (the first surface 92A side of) the pressure receiving part 921 of the piston 92, the small and large cylindrical parts 922 and 923, and the sealing ring 93, and receives hydraulic pressure from a second oil path 175 through the second and third supply ports 914 and 927. A return spring 96 for elastically biasing the piston 92 in the +X direction is disposed inside the disengaging hydraulic pressure chamber 95. When causing the friction plate unit 5 to change from the disengaged state to the engaged state, hydraulic pressure is supplied from an output port 172 of the linear solenoid valve 107 to the engaging hydraulic pressure chamber 94 and the disengaging hydraulic pressure chamber 95 through the first oil path 174 and the second oil path 175 simultaneously.

The first surface 92A of the piston 92 receives hydraulic pressure from the disengaging hydraulic pressure chamber 95 and the second surface 92B receives hydraulic pressure from the engaging hydraulic pressure chamber 94. Here, a pressure receiving area of the second surface 92B of the piston 92 is set larger than a pressure receiving area of the first surface 92A. The small cylindrical part 922 and the large cylindrical part 923 extend continuously to the pressure receiving part 921 in this order in the −X direction. Accordingly, the disengaging hydraulic pressure chamber 95 has a small volume section 95A on the +X side (inside of the small cylindrical part 922), and a large volume section 95B on the −X side (inside of the large cylindrical part 923). The first clutch 31 is required to have a function in the disengaging hydraulic pressure chamber 95 to cancel centrifugal hydraulic pressure of the engaging hydraulic pressure chamber 94.

The operation of the first clutch 31 having the above structure is the same as the operation of the second brake 22 described in the above embodiment. For example, when hydraulic pressure is supplied to the engaging hydraulic pressure chamber 94 and the disengaging hydraulic pressure chamber 95, the piston 92 moves in the −X direction (engaging direction) by a comparatively small pushing force produced based on a pressure receiving area difference between the first and second surfaces 92A and 92B. In an early stage of the engagement, the movement of the piston 92 based on the pressure receiving area difference continues for a certain period of time. Further, when the actual engaging pressure becomes the release pressure or above, the pressure reducing valve 106 starts to the operation to limit hydraulic pressure of the disengaging hydraulic pressure chamber 95 at or below the release pressure and the second surface 92B of the piston 92 receives a large pushing force.

A hydraulic pressure control executed by the hydraulic pressure controller 83 to engage the first clutch 31 is described with reference to FIG. 13 which is a time chart corresponding to FIG. 5 (the time chart of the hydraulic pressure control of the second brake 22). Note that FIG. 13 illustrates the engaging operation of the first clutch 31 and a disengaging operation of the second clutch 32 when shifting up from the second gear range to the third gear range.

Figure 13:
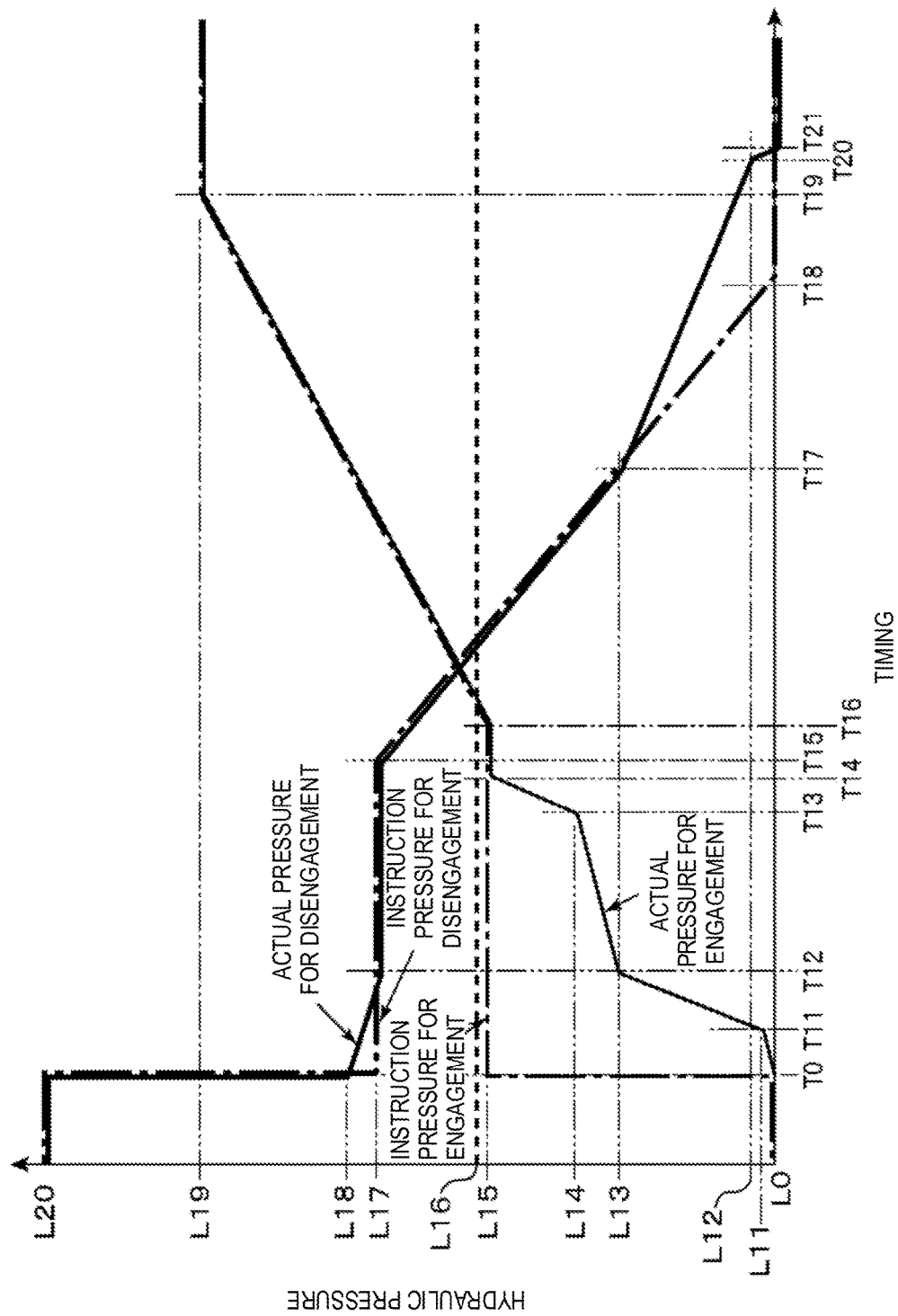
FIG. 13 is a time chart of a hydraulic pressure control executed by the hydraulic pressure controller to engage the first clutch of the automatic transmission.

As illustrated in FIG. 13, when a gear shift command is issued at a timing T0, the hydraulic pressure controller 83 instructs the linear solenoid valve 107 to output the engaging pressure at a hydraulic pressure level L15. The instruction engaging pressure is kept at the hydraulic pressure level L15 for a first period from the timing T0 to a timing T16.

Similar to the above embodiment, the actual engaging pressures in the oil paths 174 and 175 extending to the frictional engageable element gradually increase from the timing T0 to a timing T11, and increase at a sharper inclination from the timing T11 to a timing T12. Then, the actual engaging pressures gradually increase from the timing T12 to a timing T13, and then increase at a sharper inclination from the timing T13 to a timing T14. From the timing T14 to the timing T16, the actual engaging pressure is substantially the same as the hydraulic pressure level L15.

Here, the hydraulic pressure level L15 is lower than a set pressure level L16 (release pressure) of the pressure reducing valve 106. Therefore, also in the engaging operation of the first clutch 31, in the first period from the timing T0 to the timing T16, the pressure reducing valve 106 does not operate and the hydraulic pressures in the engaging hydraulic pressure chamber 94 and the disengaging hydraulic pressure chamber 95 become even.

Then, in a second period from the timing T16 to a timing T19, the hydraulic pressure controller 83 instructs the linear solenoid valve 107 to chronologically increase the engaging pressure from the hydraulic pressure level L15 to a hydraulic pressure level L19. Note that this pressure increase in the second period is also instructed to be performed gradually from the timing T16 to the timing T19. During the pressure increase (in an early part of the second period), the instruction engaging pressure and the actual engaging pressure exceed the set pressure level L16 of the pressure reducing valve 106. Thus, the hydraulic pressure of the disengaging hydraulic pressure chamber 95 is limited at the set pressure level L16, which causes a difference in pressure between the engaging hydraulic pressure chamber 94 and the disengaging hydraulic pressure chamber 95.

On the other hand, when the gear shift command is issued at the timing T0, the hydraulic pressure controller 83 instructs the second clutch 32 to perform the disengaging operation. For example, the hydraulic pressure controller 83 instructs the linear solenoid valve 109 of the second clutch 32 to sharply drop the engaging pressure from a hydraulic pressure level L20 to a hydraulic pressure level L17. Further the hydraulic pressure controller 83 instructs the linear solenoid valve 109 of the second clutch 32 to keep the engaging pressure at the hydraulic pressure level L17 from the timing T0 to a timing T15.

Note that as illustrated in FIG. 13, an actual engaging pressure for the disengaging operation in each oil path to the second clutch 32 sharply drops to a hydraulic pressure level L18 at the timing T0 and then gradually drops from the hydraulic pressure level L18 to the hydraulic pressure level L17 until the timing T12. From the timing T12 to the timing T15, the actual engaging pressure is kept at the hydraulic pressure level L17, which is substantially matched with the instruction pressure for the disengaging operation.

The hydraulic pressure controller 83 outputs a pressure drop command to the linear solenoid valve 109 at the timing T15 which is later than the timing T14 and earlier than the timing T16. For example, the hydraulic pressure controller 83 instructs the linear solenoid valve 109 to gradually drop the engaging pressure from the hydraulic pressure level L17 to a hydraulic pressure level L0 from the timing T15 to a timing T18.

Note that the timing T18 is earlier than the timing T19. Further the instruction pressure for the disengaging operation becomes lower than the set pressure level L16 of the pressure reducing valve 106 after the instruction pressure in the engaging operation exceeds the hydraulic pressure level L16.

Further, the actual engaging pressure in each oil path extending to the second clutch 32 after the timing T15 gradually drops along the instruction engaging pressure until a timing T17, and then further gradually drops to the hydraulic pressure level L12 from the timing T17 to a timing T20. After the timing T20, the actual engaging pressure sharply drops and reaches the hydraulic pressure level L0 at a timing T21. Thus, the operation of causing the second clutch 32 to change to the disengaged state and the first clutch 31 to the engaged state completes.

As described above, according to the automatic transmission 1 of this embodiment, also in the engaging operation of the first clutch 31, in the first period, the piston 92 is moved by the pushing force based on the pressure receiving area difference between the first and second surfaces 92A and 92B of the piston 92. Further in the second period, the engaging hydraulic pressure chamber 94 and the disengaging hydraulic pressure chamber 95 are adjusted to have different pressures so as to promptly move the piston 92. Therefore, the engaging shock is reduced without requiring a complicated hydraulic pressure control, and the engagement control time is shortened.

Further in the engaging operation of the first clutch 31, "pre-charging process" used in the art of WO2012/144207A1 is not provided. Therefore, the engagement control time is shortened and the control is simplified.

Modifications

In the above embodiments, the planetary-gear-type automatic transmission is described as an example; however, the present invention is not limited to this. For example, the present invention may be applied to a Continuously Variable Transmission (CVT) and a Dual Clutch Transmission (DCT).

In the above embodiments, in the control of the engaging operation, the given instruction pressure is instructed to the hydraulic pressure control valve (linear solenoid valve) in the first period, and to keep it for the first period. Further, the linearly increasing pressure is instructed to the hydraulic pressure control valve in the second period.

However, the present invention is not limited to this. For example, the instruction pressure in the first period may have an inclination, and the instruction pressure in the second period may chronologically increase in a quadratic or cubic curve manner. Note that since the first and second periods are extremely short (e.g., 100 msec. to 600 msec.), keeping the first instruction pressure at the given value and chronologically linearly increasing the second instruction pressure are desirable in view of simplifying the control.

Further in the above embodiments, the automatic transmission which receives the drive force of the engine without using a torque converter (fluid transmitter) is described as an example; however, the present invention may be applied to an automatic transmission which receives the drive force of the engine through a torque converter.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automatic Transmission
5, 105 Friction Plate Unit
6, 106 Pressure Reducing Valve
7, 107-110 Linear Solenoid Valve (Hydraulic Pressure Control Valve)
21 First Brake
22 Second Brake
26 Engaging Hydraulic Pressure Chamber
27 Disengaging Hydraulic Pressure Chamber
31 First Clutch
32 Second Clutch
33 Third Clutch
51 Drive Plate (Friction Plate)
52 Driven Plate (Friction Plate)
74, 174 First Oil Path
75, 175 Second Oil Path
80 Hydraulic Mechanism
81 Oil Pump
82 Hydraulic Circuit
83 Hydraulic Pressure Controller
94 Hydraulic Oil Pressure Chamber (Engaging Hydraulic Pressure Chamber)
95 Centrifugal Balance Hydraulic Pressure Chamber (Disengaging Hydraulic Pressure Chamber)
100 Control Unit (Control Device)
243, 924 Through-hole
244, 925 Pressure Ball (Restricting Mechanism)

What is claimed is:

1. A method of controlling an automatic transmission, the automatic transmission including:
 a piston having a first surface and a second surface opposite from each other in axial directions of the piston, and movable in the axial directions;
 a plurality of friction plates disposed on a first surface side of the piston;
 an engaging hydraulic pressure chamber for supplying hydraulic pressure to the second surface of the piston and directing the piston to an engaging position to push the friction plates to be engaged with each other in an engaged state;
 a disengaging hydraulic pressure chamber for supplying hydraulic pressure to the first surface of the piston and directing the piston to a disengaging position to cause the friction plates to be in a disengaged state;
 a hydraulic pressure control valve having an output port of hydraulic pressure, and for supplying and discharging hydraulic pressure to and from the engaging hydraulic pressure chamber and the disengaging hydraulic pressure chamber;
 a first oil path communicating the output port of the hydraulic pressure control valve with the engaging hydraulic pressure chamber; and
 a second oil path communicating the output port with the disengaging hydraulic pressure chamber, the second surface having a larger area for receiving hydraulic pressure than an area of the first surface for receiving hydraulic pressure, the method comprising controlling the friction plates to change from the disengaged state to the engaged state in response to a gear shift command, and the controlling the friction plates including:
  controlling the hydraulic pressure control valve to adjust the hydraulic pressure to a first instruction pressure in a first period in response to the gear shift command; and
  controlling the hydraulic pressure control valve to adjust the hydraulic pressure to a second instruction pressure in a second period directly following the first period, a change of the second instruction pressure being larger than a change of the first instruction pressure.

2. The method of claim 1, wherein the first instruction pressure in the first period is a given fixed value.

3. The method of claim 2, wherein the second instruction pressure increases with time from the given fixed value at the start of the second period to a value of hydraulic pressure that causes the friction plates to be in the engaged state at the end of the second period.

4. The method of claim 3, wherein
the second oil path is provided with a pressure reducing valve for preventing the hydraulic pressure inside the disengaging hydraulic pressure chamber from exceeding a given value, and
the first instruction pressure is lower than the given value.

5. The method of claim 4, wherein the piston is formed with a through-hole communicating the engaging hydraulic pressure chamber with the disengaging hydraulic pressure chamber.

6. The method of claim 5, wherein a restricting mechanism for restricting an oil flow from the engaging hydraulic pressure chamber to the disengaging hydraulic pressure chamber is disposed in the through-hole.

7. The method of claim 3, wherein the piston is formed with a through-hole communicating the engaging hydraulic pressure chamber with the disengaging hydraulic pressure chamber.

8. The method of claim 7, wherein a restricting mechanism for restricting an oil flow from the engaging hydraulic pressure chamber to the disengaging hydraulic pressure chamber is disposed in the through-hole.

9. The method of claim 2, wherein
the second oil path is provided with a pressure reducing valve for preventing the hydraulic pressure inside the disengaging hydraulic pressure chamber from exceeding a given value, and
the first instruction pressure is lower than the given value.

10. The method of claim 9, wherein the piston is formed with a through-hole communicating the engaging hydraulic pressure chamber with the disengaging hydraulic pressure chamber.

11. The method of claim 10, wherein a restricting mechanism for restricting an oil flow from the engaging hydraulic pressure chamber to the disengaging hydraulic pressure chamber is disposed in the through-hole.

12. The method of claim 2, wherein the piston is formed with a through-hole communicating the engaging hydraulic pressure chamber with the disengaging hydraulic pressure chamber.

13. The method of claim 12, wherein a restricting mechanism for restricting an oil flow from the engaging hydraulic pressure chamber to the disengaging hydraulic pressure chamber is disposed in the through-hole.

14. The method of claim 1, wherein
the second oil path is provided with a pressure reducing valve for preventing the hydraulic pressure inside the disengaging hydraulic pressure chamber from exceeding a given value, and
the first instruction pressure is lower than the given value.

15. The method of claim 14, wherein the piston is formed with a through-hole communicating the engaging hydraulic pressure chamber with the disengaging hydraulic pressure chamber.

16. The method of claim 15, wherein a restricting mechanism for restricting an oil flow from the engaging hydraulic pressure chamber to the disengaging hydraulic pressure chamber is disposed in the through-hole.

17. The method of claim 1, wherein the piston is formed with a through-hole communicating the engaging hydraulic pressure chamber with the disengaging hydraulic pressure chamber.

18. The method of claim 17, wherein a restricting mechanism for restricting an oil flow from the engaging hydraulic pressure chamber to the disengaging hydraulic pressure chamber is disposed in the through-hole.

19. A control device of an automatic transmission, the automatic transmission including:
  a piston having a first surface and a second surface opposite from each other in axial directions of the piston, and movable in the axial directions;
  a plurality of friction plates disposed on a first surface side of the piston;
  an engaging hydraulic pressure chamber for supplying hydraulic pressure to the second surface of the piston and directing the piston to an engaging position to push the friction plates to be engaged with each other in an engaged state;
  a disengaging hydraulic pressure chamber for supplying hydraulic pressure to the first surface of the piston and directing the piston to a disengaging position to cause the friction plates to be in a disengaged state;
  a hydraulic pressure control valve having an output port of hydraulic pressure, and for supplying and discharging hydraulic pressure to and from the engaging hydraulic pressure chamber and the disengaging hydraulic pressure chamber;
  a first oil path communicating the output port of the hydraulic pressure control valve with the engaging hydraulic pressure chamber; and
  a second oil path communicating the output port with the disengaging hydraulic pressure chamber, the second surface has a larger area for receiving hydraulic pressure than an area of the first surface for receiving hydraulic pressure,
  the control device including a processor configured to execute instructions to control the friction plates to change from the disengaged state to the engaged state in response to a gear shift command by controlling the hydraulic pressure control valve to adjust the hydraulic pressure to a first instruction pressure in a first period in response to the gear shift command, and by controlling the hydraulic pressure control valve to adjust the hydraulic pressure to a second instruction pressure in a second period directly following the first period, a change of the second instruction pressure being larger than a change of the first instruction pressure.

20. An automatic transmission, comprising:
a plurality of frictional engageable elements;

a hydraulic circuit for supplying and discharging hydraulic pressure to and from the plurality of frictional engageable elements;

a hydraulic pressure control valve provided in the hydraulic circuit, and for controlling the supply and discharging of the hydraulic pressure to and from the plurality of frictional engageable elements; and a control unit for controlling the hydraulic pressure control valve, the control unit including a processor configured to execute instructions to control the hydraulic pressure control valve to adjust the hydraulic pressure to a first instruction pressure in a first period in response to a gear shift command of the automatic transmission, and control the hydraulic pressure control valve to adjust the hydraulic pressure to a second instruction pressure in a second period directly following the first period, a change of the second instruction pressure being larger than a change of the first instruction pressure.

* * * * *